United States Patent
Kim et al.

(10) Patent No.: US 12,009,519 B2
(45) Date of Patent: Jun. 11, 2024

(54) CATHODE ACTIVE MATERIAL, PREPARATION METHOD THEREOF, CATHODE INCLUDING THE SAME, AND SECONDARY BATTERY

(71) Applicant: Samsung Electronics Co., Ltd., Suwon-si (KR)

(72) Inventors: Joonhee Kim, Seoul (KR); Sangbok Ma, Suwon-si (KR); Jonghoon Ka, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 163 days.

(21) Appl. No.: 17/482,684

(22) Filed: Sep. 23, 2021

(65) Prior Publication Data

US 2022/0336803 A1    Oct. 20, 2022

(30) Foreign Application Priority Data

Apr. 20, 2021    (KR) ........................ 10-2021-0051350

(51) Int. Cl.
  *H01M 4/525*    (2010.01)
  *H01M 4/04*    (2006.01)
  *H01M 4/36*    (2006.01)
  *H01M 10/0562*    (2010.01)

(52) U.S. Cl.
  CPC ......... *H01M 4/525* (2013.01); *H01M 4/0471* (2013.01); *H01M 4/366* (2013.01); *H01M 10/0562* (2013.01)

(58) Field of Classification Search
  CPC .............................................. H01M 10/0562
  See application file for complete search history.

(56) References Cited

U.S. PATENT DOCUMENTS

| | | | |
|---|---|---|---|
| 8,052,897 B2 | 11/2011 | Xi et al. | |
| 10,741,847 B2 | 8/2020 | Min et al. | |
| 10,930,927 B2 | 2/2021 | Miara et al. | |
| 2013/0273425 A1 | 10/2013 | Ceder et al. | |
| 2014/0246619 A1 | 9/2014 | Hautier et al. | |
| 2016/0118685 A1* | 4/2016 | Zhang ................. | H01M 10/056 429/231.95 |

FOREIGN PATENT DOCUMENTS

| | | |
|---|---|---|
| CN | 104752697 A | 7/2015 |
| CN | 105731409 A | 7/2016 |
| EP | 2943437 A2 | 11/2015 |

(Continued)

OTHER PUBLICATIONS

WO2020031690A1_Machine Translation—Original foriegn patent inlcuded in IDS (Year: 2020).*

(Continued)

*Primary Examiner* — Jonathan G Leong
*Assistant Examiner* — Aryana Y. Ortiz
(74) *Attorney, Agent, or Firm* — CANTOR COLBURN LLP

(57) ABSTRACT

A cathode active material includes a compound represented by Formula 1:

$$Li_x(Co_{1-y}M_y)_z(P_2O_7)_4 \quad \text{Formula 1}$$

wherein in Formula 1, $5 \le x \le 7$, $0.01 \le y \le 0.1$, and $4 \le z \le 6$, and M is a Group 3 to 11 element belonging to 5th and 6th periods in the Periodic Table of the elements, or a combination thereof.

17 Claims, 10 Drawing Sheets

(56) References Cited

FOREIGN PATENT DOCUMENTS

| JP | 5682040 B2 | 3/2015 |
|---|---|---|
| JP | 2016508946 A | 3/2016 |
| KR | 1020180058547 A | 6/2018 |
| KR | 1020190053111 A | 5/2019 |
| WO | 2014181436 A1 | 11/2014 |
| WO | 2018032569 A1 | 2/2018 |
| WO | 2020031690 A1 | 2/2020 |
| WO | 2022085891 A1 | 4/2022 |

OTHER PUBLICATIONS

Sanz et al. "Crystal growth, crystal structure, and magnetic properties of a new lithium cobalt diphosphate." Chemistry of Materials 12, No. 3, pp. 671-676—included in IDS (Year: 2000).*

F. Sanz et al., "Crystal Growth, Crystal Structure, and Magnetic Properties of a New Lithium Cobalt Diphosphate," Chem. Mater., Published on Web Feb. 12, 2000, pp. 671-676, vol. 12.

Patrycja Makula et al., "How to Correctly Determine the Band Gap Energy of Modified Semiconductor Photocatalysts Based on UV-Vis Spectra," The Journal of Physical Chemistry Letters, Dec. 6, 2018, pp. 6814-6817, vol. 9.

\* cited by examiner

CATHODE ACTIVE MATERIAL, PREPARATION METHOD THEREOF, CATHODE INCLUDING THE SAME, AND SECONDARY BATTERY

CROSS-REFERENCE TO RELATED APPLICATION

This application claims priority to Korean Patent Application No. 10-2021 0051350, filed on Apr. 20, 2021, in the Korean Intellectual Property Office, and all the benefits accruing therefrom under 35 U.S.C. § 119, the content of which is incorporated herein by reference herein in its entirety.

BACKGROUND

1. Field

The present disclosure relates to cathode active materials, preparation methods thereof, cathodes including the same, and secondary batteries.

2. Description of the Related Art

Since a lithium secondary battery can include an electrolyte containing a flammable organic solvent, there is a possibility of overheating and fire when a short circuit occurs. In this regard, an all-solid battery using a solid electrolyte instead of an electrolyte containing flammable organic solvents has been proposed.

Since an all-solid battery does not use a flammable organic solvent, the possibility of a fire or explosion may be greatly reduced even when a short circuit occurs. Therefore, such an all-solid battery may have significantly increased safety compared to a lithium-ion battery using an electrolyte that contains flammable organic solvents.

Since an all-solid battery is capable of being charged beyond the voltage limit of a liquid electrolyte, a high-voltage cathode material may be used, and additional battery energy density may be increased.

An all-solid battery including a metal oxide as an anode material requires a high-voltage cathode material because the driving voltage of the battery is lower than that of a battery including a carbon-based anode material.

A phosphate cathode material having an olivine structure has a low voltage of about 4.8 V and low electronic conductivity. Accordingly there remains a need in the art for cathode active materials that have a higher voltage and improved electronic conductivity.

SUMMARY

Provided is a novel cathode active material providing high voltage and having high-rate characteristics.

Provided is a cathode and a secondary battery including the cathode active material.

Provided are methods of preparing the cathode active materials.

Additional aspects will be set forth in part in the description which follows and, in part, will be apparent from the description, or may be learned by practice of the presented embodiments of the disclosure.

According to an aspect of an embodiment, a cathode active material includes a compound represented by Formula 1:

      Formula 1 wherein, in Formula 1, $5 \leq x \leq 7$, $0.01 \leq y \leq 0.1$, and $4 \leq z \leq 6$, and M is a Group 3 to 11 element belonging to 5th and 6th periods in the Periodic Table of the Elements, or a combination thereof.

According to an aspect of another embodiment, a cathode includes the cathode active material.

A cathode active material layer includes a layer comprising the cathode active material.

A cathode includes: a cathode current collector and a cathode active material layer on a surface of the cathode current collector, the cathode active material layer comprising the cathode active material.

According to an aspect of another embodiment, a secondary battery includes a cathode, an anode, and an electrolyte between the cathode and the anode, wherein the cathode includes the cathode active material.

According to an aspect of another embodiment, a method of preparing a cathode active material includes mixing a cobalt precursor, a lithium precursor, a phosphorus precursor, and an M precursor to prepare a precursor mixture, and heat-treating the precursor mixture to form the cathode active material, wherein the cathode active material includes a compound represented by Formula 1:

      Formula 1 wherein in Formula 1, $5 \leq x \leq 7$, $0.01 \leq y \leq 0.1$, and $4 \leq z \leq 6$, and M is a Group 3 to 11 element belonging to 5th and 6th periods in the Periodic Table of the Elements, or a combination thereof.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
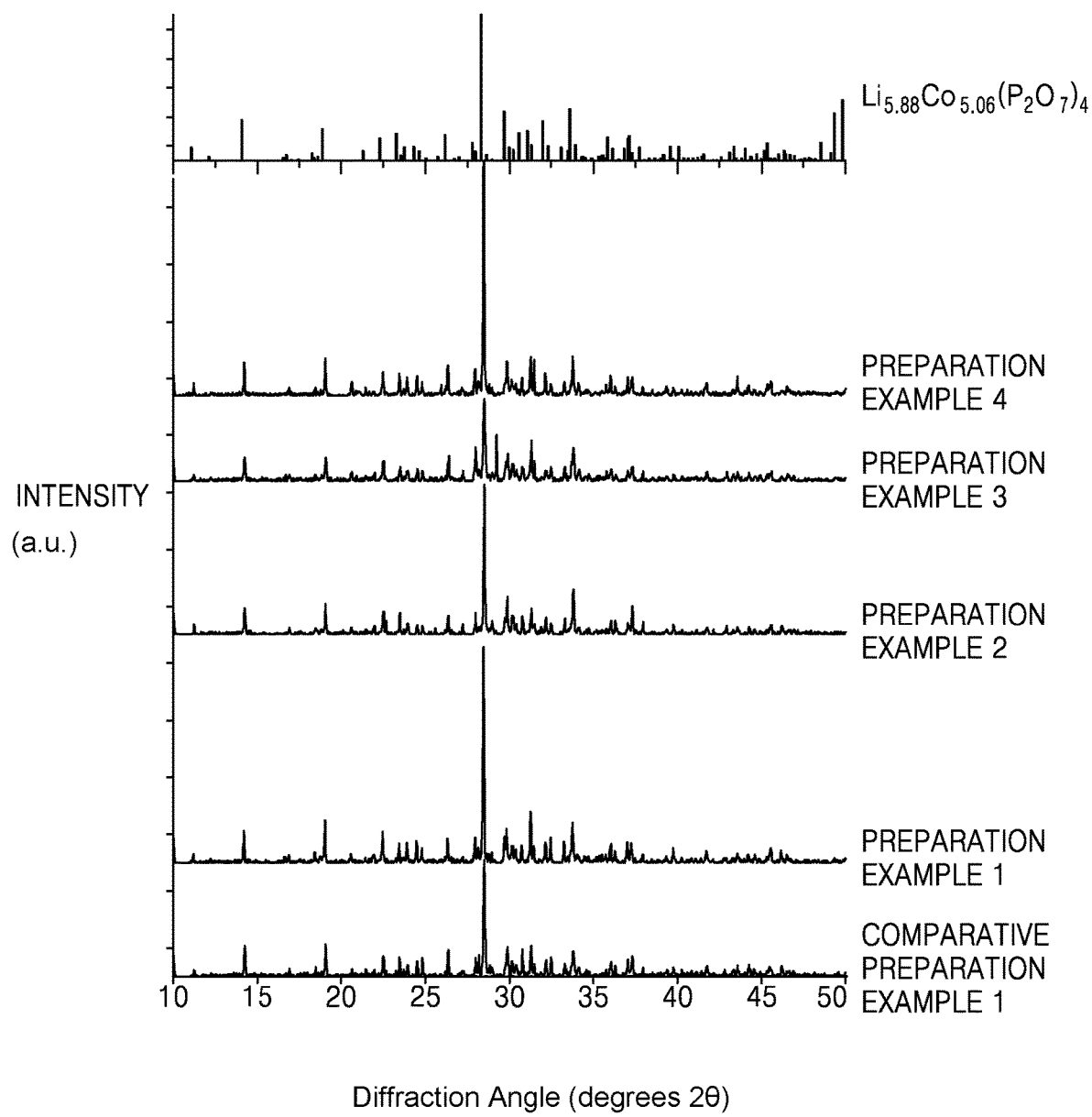
FIG. 1 is a graph of intensity (arbitrary units, a.u.) versus diffraction angle (degrees 2θ) and illustrates the results of X-ray diffraction analysis of cathode active materials of Preparation Examples 1 to 4 and Comparative Preparation Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

Since the present inventive concept to be described below may be modified and may have various embodiments, specific embodiments are illustrated in the drawings and described in detail in the detailed description. However, this is not intended to limit the present inventive concept to a specific embodiment, and it should be understood to include all modifications, equivalents, or substitutes included in the technical scope of the present inventive concept.

The terms used herein are only used to describe specific embodiments and are not intended to limit the present inventive concept. Singular expressions include plural expressions unless the context clearly indicates otherwise. Hereinafter, it will be further understood that the terms "comprise", "include" or "have," when used in this specification, specify the presence of stated features, integers, steps, operations, elements, and/or components, but do not preclude the presence or addition of one or more other features, integers, steps, operations, elements, components, and/or groups thereof. The "/" used herein may be interpreted as "and" or as "or" depending on the situation.

In the drawings, thickness is enlarged or reduced in order to clearly express various layers and regions. Throughout the specification, the same reference numerals designate the same components. Throughout the specification, when a component such as a layer, a film, a region, or a plate is mentioned to be placed "on" another component, it will be understood that it may be directly on another component or that another component may be interposed therebetween. In contrast, when an element is referred to as being "directly on" another element, there are no intervening elements present. Throughout the specification, although the terms "first", "second", "third", etc., may be used herein to describe various elements, components, regions, and/or layers, these elements, components, regions, and/or layers should not be limited by these terms. These terms are only used to distinguish one component from another component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a cathode active material according to an embodiment, a cathode including the cathode active material, a lithium battery including the cathode, and an article including the cathode will be described in further detail.

There is provided a cathode active material including a compound represented by Formula 1:

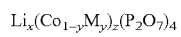
$$Li_x(Co_{1-y}M_y)_z(P_2O_7)_4 \qquad \text{Formula 1}$$

wherein, in Formula 1, 5≤x≤7, 0.01≤y≤0.1, and 4≤z≤6, and M is a Group 3 to 11 element belonging to 5th and 6th periods in the Periodic Table of the Elements, or a combination thereof.

In an aspect, x, y, and z may be independently selected, and x is, for example, 5.5 to 6.5 or 5.8 to 6.2 or 5.9 to 6.1 or 6, y is, for example, 0.01 to 0.09, 0.01 to 0.08, or 0.01 to 0.05, and z is, for example, 4.5 to 5.5, 4.8 to 5.2, or 4.9 to 5.1, or 5.

A pyrophosphate-based compound such as $Li_6Co_5(P_2O_7)_4$ may provide a high voltage of 5 volts (V) or more and a discharge capacity of 150 milliampere-hours per gram (mAh/g), or more, and may conduct lithium ions. However, since such a compound has low electronic conductivity, the charge and discharge characteristics of a lithium battery including this compound are poor. In contrast, the cathode active material including the compound represented by Formula 1 may have increased electronic conductivity by doping a portion of the Co with a 4d metal or a 5d metal, or a combination thereof. Accordingly, the high-rate characteristics of a lithium battery including such a cathode active material are improved. The 4d metal is a Group 3 to 11 element belonging to the 5th period of the Periodic Table of the Elements. The 5d metal is a Group 3 to 11 element belonging to the 6th period of the Periodic Table of the Elements. The 4d metals and 5d metals are metals including electrons arranged in 4d orbitals and 5d orbitals. For example, when a portion of the Co is substituted with a 4d metal or a 5d metal, or a combination thereof, a stable phase may be maintained, and a band gap may be reduced. Accordingly, the pyrophosphate-based compound in which a portion of the Co is substituted with a 4d metal or a 5d metal, or a combination thereof has an increased electronic conductivity due to a reduced band gap. In contrast, when a portion of the Co is substituted with a 3d metal, it is difficult to obtain a stable pyrophosphate phase. The 3d metal is a Group 3 to 11 element belonging to the 4th period of the Periodic Table of the Elements.

Further, the cathode active material including the compound represented by Formula 1 can provide a high voltage. Accordingly, a lithium battery including the cathode active material containing the compound represented by Formula 1 can have improved energy density in addition to high-rate characteristics.

In Formula 1, M can be Y, La, Zr, Hf, Nb, Ta, Mo, W, Tc, Re, Ru, Os, Co, Rh, Ir, Pd, Pt, Ag, Au, or a combination thereof, and for example, M is Nb, Mo, Ta, W or a combination thereof.

The compound represented by Formula 1 can be a compound represented by the following Formulas 2a to 2r:

$$Li_x(Co_{1-y}Nb_y)_z(P_2O_7)_4 \quad \text{Formula 2a}$$

wherein in Formula 2a, $5.5 \leq x \leq 6.5$, $0.01 \leq y \leq 0.05$, and $4.8 \leq z \leq 5.2$, $$Li_x(Co_{1-y}Mo_y)_z(P_2O_7)_4 \quad \text{Formula 2b}$$

wherein in Formula 2b, $5.5 \leq x \leq 6.5$, $0.01 \leq y \leq 0.05$, and $4.8 \leq z \leq 5.2$, $$Li_x(Co_{1-y}Ta_y)_z(P_2O_7)_4 \quad \text{Formula 2c}$$

wherein in Formula 2c, $5.5 \leq x \leq 6.5$, $0.01 \leq 00.05$, and $4.8 \leq z \leq 5.2$, $$Li_x(Co_{1-y}W_y)_z(P_2O_7)_4 \quad \text{Formula 2d}$$

wherein in Formula 2d, $5.5 \leq x \leq 6.5$, $0.01 \leq 00.05$, and $4.8 \leq z \leq 5.2$, $$Li_x(Co_{1-y}Y_y)_z(P_2O_7)_4 \quad \text{Formula 2e}$$

wherein in Formula 2e, $5.5 \leq x \leq 6.5$, $0.01 \leq y \leq 0.05$, and $4.8 \leq z \leq 5.2$, $$Li_x(Co_{1-y}La_y)_z(P_2O_7)_4 \quad \text{Formula 2f}$$

wherein in Formula 2f, $5.5 \leq x \leq 6.5$, $0.01 \leq y \leq 0.05$, and $4.8 \leq z \leq 5.2$, $$Li_x(Co_{1-y}Zr_y)_z(P_2O_7)_4 \quad \text{Formula 2g}$$

wherein in Formula 2g, $5.5 \leq x \leq 6.5$, $0.01 \leq y \leq 0.05$, and $4.8 \leq z \leq 5.2$, $$Li_x(Co_{1-y}Hf_y)_z(P_2O_7)_4 \quad \text{Formula 2h}$$

wherein in Formula 2h, $5.5 \leq x \leq$ $$Li_x(Co_{1-y}TC_y)_z(P_2O_7)_4 \quad \text{Formula 2i}$$

wherein in Formula 2i, $5.5 \leq x \leq 6.5$, $0.01 \leq y \leq 0.05$, and $4.8 \leq z \leq 5.2$, $$Li_x(Co_{1-y}Re_y)_z(P_2O_7)_4 \quad \text{Formula 2j}$$

wherein in Formula 2j, $5.5 \leq x \leq 6.5$, $0.01 \leq y \leq 0.05$, and $4.8 \leq z \leq 5.2$, $$Li_x(Co_{1-y}Ru_y)_z(P_2O_7)_4 \quad \text{Formula 2k}$$

wherein in Formula 2k, $5.5 \leq x \leq 6.5$, $0.01 \leq y \leq 0.05$, and $4.8 \leq z \leq 5.2$, $$Li_x(Co_{1-y}Os_y)_z(P_2O_7)_4 \quad \text{Formula 2l}$$

wherein in Formula 2l, $5.5 \leq x \leq 6.5$, $0.01 \leq y \leq 0.05$, and $4.8 \leq z \leq 5.2$, $$Li_x(Co_{1-y}Rh_y)_z(P_2O_7)_4 \quad \text{Formula 2m}$$

wherein in Formula 2m, $5.5 \leq x \leq 6.5$, $0.01 \leq y \leq 0.05$, and $4.8 \leq z \leq 5.2$, $$Li_x(Co_{1-y}Ir_y)_z(P_2O_7)_4 \quad \text{Formula 2n}$$

wherein in Formula 2n, $5.5 \leq x \leq 6.5$, $0.01 \leq y \leq 0.05$, and $4.8 \leq z \leq 5.2$, $$Li_x(Co_{1-y}Pd_y)_z(P_2O_7)_4 \quad \text{Formula 2o}$$

wherein in Formula 2o, $5.5 \leq x \leq 6.5$, $0.01 \leq y \leq 0.05$, and $4.8 \leq z \leq 5.2$, $$Li_x(Co_{1-y}Pt_y)_z(P_2O_7)_4 \quad \text{Formula 2p}$$

wherein in Formula 2p, $5.5 \leq x \leq 6.5$, $0.01 \leq y \leq 0.05$, and $4.8 \leq z \leq 5.2$, $$Li_x(Co_{1-y}Ag_y)_z(P_2O_7)_4 \quad \text{Formula 2q}$$

wherein in Formula 2q, $5.5 \leq x \leq 6.5$, $0.01 \leq y \leq 0.05$, and $4.8 \leq z \leq 5.2$, or $$Li_x(Co_{1-y}Au_y)_z(P_2O_7)_4 \quad \text{Formula 2r}$$

wherein in Formula 2r, $5.5 \leq x \leq 6.5$, $0.01 \leq y \leq 0.05$, and $4.8 \leq z \leq 5.2$.

In an embodiment, in formulas 2a to 2r, $5.8 \leq x \leq 6.2$ or $5.9 \leq x \leq 6.1$ or x is 6, $0.01 \leq y \leq 0.05$, and $4.9 \leq z \leq 5.1$ or z is 5.

The compound represented by Formula 1 can be, for example, a compound represented by the following formulas:

$Li_6(Co_{0.99}Nb_{0.01})_5(P_2O_7)_4$, $Li_6(Co_{0.98}Nb_{0.02})_5(P_2O_7)_4$, $Li_6(Co_{0.97}Nb_{0.03})_5(P_2O_7)_4$, $Li_6(Co_{0.96}Nb_{0.04})_5(P_2O_7)_4$, $Li_6(Co_{0.95}Nb_{0.05})_5(P_2O_7)_4$, $Li_6(Co_{0.93}Nb_{0.07})_5(P_2O_7)_4$, $Li_6(Co_{0.90}Nb_{0.10})_5(P_2O_7)_4$, $Li_6(Co_{0.99}Mo_{0.01})_5(P_2O_7)_4$, $Li_6(Co_{0.98}Mo_{0.02})_5(P_2O_7)_4$, $Li_6(Co_{0.97}Mo_{0.03})_5(P_2O_7)_4$, $Li_6(Co_{0.96}Mo_{0.04})_5(P_2O_7)_4$, $Li_6(Co_{0.95}Mo_{0.05})_5(P_2O_7)_4$, $Li_6(Co_{0.93}Mo_{0.07})_5(P_2O_7)_4$, $Li_6(Co_{0.90}Mo_{0.10})_5(P_2O_7)_4$, $Li_6(Co_{0.99}Ta_{0.01})_5(P_2O_7)_4$, $Li_6(Co_{0.98}Ta_{0.02})_5(P_2O_7)_4$, $Li_6(Co_{0.97}Ta_{0.03})_5(P_2O_7)_4$, $Li_6(Co_{0.96}Ta_{0.04})_5(P_2O_7)_4$, $Li_6(Co_{0.95}Ta_{0.05})_5(P_2O_7)_4$, $Li_6(Co_{0.93}Ta_{0.07})_5(P_2O_7)_4$, $Li_6(Co_{0.90}Ta_{0.10})_5(P_2O_7)_4$, $Li_6(Co_{0.99}W_{0.01})_5(P_2O_7)_4$, $Li_6(Co_{0.98}W_{0.02})_5(P_2O_7)_4$, $Li_6(Co_{0.97}W_{0.03})_5(P_2O_7)_4$, $Li_6(Co_{0.96}W_{0.04})_5(P_2O_7)_4$, $Li_6(Co_{0.95}W_{0.05})_5(P_2O_7)_4$, $Li_6(Co_{0.93}W_{0.07})_5(P_2O_7)_4$, $Li_6(Co_{0.90}W_{0.10})_5(P_2O_7)_4$, $Li_6(Co_{0.99}W_{0.01})_5(P_2O_7)_4$, $Li_6(Co_{0.98}W_{0.02})_5(P_2O_7)_4$, $Li_6(Co_{0.97}W_{0.03})_5(P_2O_7)_4$, $Li_6(Co_{0.96}W_{0.04})_5(P_2O_7)_4$, $Li_6(Co_{0.95}W_{0.05})_5(P_2O_7)_4$, $Li_6(Co_{0.93}W_{0.07})_5(P_2O_7)_4$, $Li_6(Co_{0.90}Y_{0.10})_5(P_2O_7)_4$, $Li_6(Co_{0.99}La_{0.01})_5(P_2O_7)_4$, $Li_6(Co_{0.98}La_{0.02})_5(P_2O_7)_4$, $Li_6(Co_{0.97}La_{0.03})_5(P_2O_7)_4$, $Li_6(Co_{0.96}La_{0.04})_5(P_2O_7)_4$, $Li_6(Co_{0.95}La_{0.05})_5(P_2O_7)_4$, $Li_6(Co_{0.93}La_{0.07})_5(P_2O_7)_4$, $Li_6(Co_{0.90}La_{0.10})_5(P_2O_7)_4$, $Li_6(Co_{0.99}Zr_{0.01})_5(P_2O_7)_4$, $Li_6(Co_{0.98}Zr_{0.02})_5(P_2O_7)_4$, $Li_6(Co_{0.97}Zr_{0.03})_5(P_2O_7)_4$, $Li_6(Co_{0.96}Zr_{0.04})_5(P_2O_7)_4$, $Li_6(Co_{0.95}Zr_{0.05})_5(P_2O_7)_4$, $Li_6(Co_{0.93}Zr_{0.07})_5(P_2O_7)_4$, $Li_6(Co_{0.90}Zr_{0.10})_5(P_2O_7)_4$, $Li_6(Co_{0.99}Hf_{0.01})_5(P_2O_7)_4$, $Li_6(Co_{0.98}Hf_{0.02})_5(P_2O_7)_4$, $Li_6(Co_{0.97}Hf_{0.03})_5(P_2O_7)_4$, $Li_6(Co_{0.96}Hf_{0.04})_5(P_2O_7)_4$, $Li_6(Co_{0.95}Hf_{0.05})_5(P_2O_7)_4$, $Li_6(Co_{0.93}Hf_{0.07})_5(P_2O_7)_4$, $Li_6(Co_{0.90}Hf_{0.10})_5(P_2O_7)_4$, $Li_6(Co_{0.99}TC_{0.01})_5(P_2O_7)_4$, $Li_6(Co_{0.98}TC_{0.02})_5(P_2O_7)_4$, $Li_6(Co_{0.97}Hf_{0.03})_5(P_2O_7)_4$, $Li_6(Co_{0.96}TC_{0.04})_5(P_2O_7)_4$, $Li_6(Co_{0.95}TC_{0.05})_5(P_2O_7)_4$, $Li_6(Co_{0.93}Hf_{0.07})_5(P_2O_7)_4$, $Li_6(Co_{0.90}TC_{0.10})_5(P_2O_7)_4$, $Li_6(Co_{0.99}Re_{0.01})_5(P_2O_7)_4$, $Li_6(Co_{0.98}Re_{0.02})_5(P_2O_7)_4$, $Li_6(Co_{0.97}Hf_{0.03})_5(P_2O_7)_4$, $Li_6(Co_{0.96}Re_{0.04})_5(P_2O_7)_4$, $Li_6(Co_{0.95}Re_{0.05})_5(P_2O_7)_4$, $Li_6(Co_{0.93}Hf_{0.07})_5(P_2O_7)_4$, $Li_6(Co_{0.90}Re_{0.10})_5(P_2O_7)_4$, $Li_6(Co_{0.99}Rh_{0.01})_5(P_2O_7)_4$, $Li_6(Co_{0.98}Rh_{0.02})_5(P_2O_7)_4$, $Li_6(Co_{0.97}Hf_{0.03})_5(P_2O_7)_4$, $Li_6(Co_{0.96}Rh_{0.04})_5(P_2O_7)_4$, $Li_6(Co_{0.95}Rh_{0.05})_5(P_2O_7)_4$, $Li_6(Co_{0.93}Hf_{0.07})_5(P_2O_7)_4$, $Li_6(Co_{0.90}Rh_{0.10})_5(P_2O_7)_4$, $Li_6(Co_{0.99}Os_{0.01})_5(P_2O_7)_4$, $Li_6(Co_{0.98}Os_{0.02})_5(P_2O_7)_4$, $Li_6(Co_{0.97}Hf_{0.03})_5(P_2O_7)_4$, $Li_6(Co_{0.96}Os_{0.04})_5(P_2O_7)_4$, $Li_6(Co_{0.95}Os_{0.05})_5(P_2O_7)_4$, $Li_6(Co_{0.93}Hf_{0.07})_5(P_2O_7)_4$, $Li_6(Co_{0.90}Os_{0.10})_5(P_2O_7)_4$, $Li_6(Co_{0.99}Rh_{0.01})_5(P_2O_7)_4$, $Li_6(Co_{0.98}Rh_{0.02})_5(P_2O_7)_4$, $Li_6(Co_{0.97}Hf_{0.03})_5(P_2O_7)_4$, $Li_6(Co_{0.96}Rh_{0.04})_5(P_2O_7)_4$, $Li_6(Co_{0.95}Rh_{0.05})_5(P_2O_7)_4$, $Li_6(Co_{0.93}Hf_{0.07})_5(P_2O_7)_4$, $Li_6(Co_{0.90}Rh_{0.10})_5(P_2O_7)_4$, $Li_6(Co_{0.99}Ir_{0.01})_5(P_2O_7)_4$, $Li_6(Co_{0.98}Ir_{0.02})_5(P_2O_7)_4$, $Li_6(Co_{0.97}Hf_{0.03})_5(P_2O_7)_4$, $Li_6(Co_{0.96}Ir_{0.04})_5(P_2O_7)_4$, $Li_6(Co_{0.95}Ir_{0.05})_5(P_2O_7)_4$, $Li_6(Co_{0.93}Hf_{0.07})_5(P_2O_7)_4$, $Li_6(Co_{0.90}Rh_{0.10})_5(P_2O_7)_4$, $Li_6(Co_{0.99}Pd_{0.01})_5(P_2O_7)_4$, $Li_6(Co_{0.98}Pd_{0.02})_5(P_2O_7)_4$, $Li_6(Co_{0.97}Hf_{0.03})_5(P_2O_7)_4$, $Li_6(Co_{0.96}Pd_{0.04})_5(P_2O_7)_4$, $Li_6(Co_{0.95}Pd_{0.05})_5(P_2O_7)_4$, $Li_6(Co_{0.93}Hf_{0.07})_5(P_2O_7)_4$, $Li_6(Co_{0.90}Pd_{0.10})_5(P_2O_7)_4$, $Li_6(Co_{0.99}Pt_{0.01})_5(P_2O_7)_4$, $Li_6(Co_{0.98}Pt_{0.02})_5(P_2O_7)_4$, $Li_6(Co_{0.97}Hf_{0.03})_5(P_2O_7)_4$, $Li_6(Co_{0.96}Pt_{0.04})_5(P_2O_7)_4$, $Li_6(Co_{0.95}Pt_{0.05})_5(P_2O_7)_4$, $Li_6(Co_{0.93}Hf_{0.07})_5(P_2O_7)_4$, $Li_6(Co_{0.90}Pt_{0.10})_5(P_2O_7)_4$, $Li_6(Co_{0.99}Ag_{0.01})_5(P_2O_7)_4$, $Li_6(Co_{0.98}Ag_{0.02})_5(P_2O_7)_4$, $Li_6(Co_{0.97}Hf_{0.03})_5(P_2O_7)_4$, $Li_6(Co_{0.96}Ag_{0.04})_5(P_2O_7)_4$, $Li_6(Co_{0.95}Ag_{0.05})_5(P_2O_7)_4$, $Li_6(Co_{0.93}Hf_{0.07})_5(P_2O_7)_4$, $Li_6(Co_{0.90}Ag_{0.10})_5(P_2O_7)_4$, $Li_6(Co_{0.99}Au_{0.01})_5(P_2O_7)_4$, $Li_6(Co_{0.98}Au_{0.02})_5(P_2O_7)_4$, $Li_6(Co_{0.97}Hf_{0.03})_5(P_2O_7)_4$, $Li_6(Co_{0.96}Ag_{0.04})_5(P_2O_7)_4$, $Li_6(Co_{0.95}Ag_{0.05})_5(P_2O_7)_4$, $Li_6(Co_{0.93}Hf_{0.07})_5(P_2O_7)_4$, or $Li_6(Co_{0.90}Au_{0.10})_5(P_2O_7)_4$.

The compound represented by Formula 1, which is a $Li_6M_5(P_2O_7)_4$ type cathode active material, has a crystal structure belonging to a triclinic crystal system, and the crystal structure thereof belongs to a P−1 space group. In $Li_6M_5(P_2O_7)_4$, M contains Co, and a portion of the Co is substituted with a 4d metal or a 5d metal, or a combination thereof, and the crystal system and space group are maintained.

The compound represented by Formula 1 comprises, e.g., is doped with, a 4d metal or a 5d metal, or a combination thereof, thereby reducing a band gap. The band gap of the compound represented by Formula 1 is, for example, about 0.1 to about 2.0 electron volts (eV), about 0.1 to about 1.5 eV, or about 0.1 to about 1.0 eV. The band gap may be determined, for example, by calculation or experimentation. The band gap may be calculated using, for example, density functional theory (DFT). The band gap may be measured using an optical spectrum such as an optical ellipsometry spectrum or a UV-VIS spectrum. The band gap may be measured by a method disclosed in J. Phys. Chem. Lett. 2018, 9, 23, 6814-6817.

The compound represented by Formula 1 may have an average discharge voltage of about 4.0 volts (V) or more. For example, the average discharge voltage of the compound represented by Formula 1 may be about 4 V to about 6 V, about 4 V to about 5.5 V, about 4 V to about 5 V, or about 4 V to about 4.5 V. Since the compound represented by Formula 1 has a high average discharge voltage within the above ranges, energy density of a lithium battery including the compound of Formula 1 may be improved. The average discharge voltage may be, for example, a voltage obtained by dividing a value obtained by integrating an area of a profile in a discharge profile graph for a discharge voltage and a specific capacity by a discharge capacity.

Referring to FIG. 1, the compound represented by Formula 1 has a primary peak at a diffraction angle of $28.0°2\theta \pm 1.0°2\theta$ when analyzed by X-ray diffraction analysis of the compound represented by Formula 1 using Cu-Kα radiation. Further, the compound represented by Formula 1 has a secondary peak at a diffraction angle of $33.5°2\theta \pm 1.0°2\theta$ when analyzed by X-ray diffraction analysis of the compound represented by Formula 1 using Cu-Kα radiation. Further, the ratio (P2/P1) of an intensity (P2) of the secondary peak to an intensity (P1) of the primary peak, which are obtained by the X-ray diffraction analysis of the compound represented by Formula 1 using Cu-Kα radiation, is greater than 0 and equal to or less than about 0.5, about 0.4 or less, about 0.1 to about 0.5, about 0.1 to about 0.4, about 0.1 to about 0.3, or about 0.1 to about 0.3.

In the present specification, the "primary peak" indicates a peak having the maximum intensity, and the "secondary peak" indicates a peak having a weaker intensity than the primary peak.

According to another embodiment, there is provided a cathode including the above-described cathode active material.

The cathode includes a cathode current collector and a cathode active material layer on one or both surfaces of the cathode current collector. The cathode active material layer includes the cathode active material and can include a layer comprising the cathode active material. Depending on the method of manufacturing the cathode, the cathode current collector may be omitted.

The content of the cathode active material included in the cathode active material layer is, for example, about 30 weight percent (wt %) to about 100 wt % or about 50 wt % to about 100 wt %, based on the total weight of the cathode active material layer.

The cathode active material layer may further include or may not include a conductive material and/or a binder.

The content of the conductive material included in the cathode active material layer may be 0 wt % to about 40 wt %, about 0.1 wt % to about 30 wt %, about 1 wt % to about 20 wt %, or about 2 wt % to about 10 wt %, based on the total weight of the cathode active material layer.

The content of the binder included in the cathode active material layer may be 0 wt % to about 30 wt %, about 0.1 wt % to about 20 wt %, or about 1 wt % to about 10 wt %, based of the total weight of the cathode active material layer.

The kinds of the conductive material and the binder included in the cathode active material layer are not particularly limited, and any suitable cathode conductive material and any suitable binder may be used.

The cathode may provide a high average discharge voltage by including the cathode active material.

According to another embodiment, there is provided a secondary battery including: a cathode; an anode; and an electrolyte between the cathode and the anode, wherein the cathode includes the cathode active material.

The secondary battery is, for example, a lithium secondary battery or an all-solid battery. The secondary battery may be, for example, a multi-layer ceramic (MLC) battery or a thin-film battery. The multi-layer ceramic battery or the thin-film battery includes a cathode containing the cathode active material.

The multi-layer ceramic battery may include: a plurality of cathode layers; a plurality of anode layers alternately arranged between the plurality of cathode layers; and a plurality of solid electrolyte layers alternately arranged between the plurality of cathode layers and the plurality of anode layers. At least one of the plurality of the cathode layers comprises the cathode active material.

The multi-layer ceramic battery can include a solid electrolyte, for example, an oxide-based solid electrolyte. In an embodiment, at least one of the plurality of the solid electrolyte layers includes the oxide-based solid electrolyte.

The anode layer included in the multi-layer ceramic battery comprises an anode active material comprising lithium metal phosphate oxide, lithium metal oxide, metal oxide, or a combination thereof.

The multi-layer ceramic battery can be a sintered product of a laminate in which a cathode active material precursor, a solid electrolyte precursor, and an anode active material precursor are sequentially stacked, or a sintered product of a laminate in which a cathode active material, a solid electrolyte, and an anode active material are sequentially stacked.

The multi-layer ceramic battery is provided with a laminate structure including a plurality of unit cells, wherein in each unit cell a cathode layer including a cathode active material layer, a solid electrolyte layer, and an anode layer including an anode active material layer are sequentially and continuously arranged. The unit cells are stacked in such a way that a cathode active material layer in one unit cell faces the anode active material layer in another unit cell. The multi-layer ceramic battery may further include a cathode current collector and/or an anode current collector. When the multi-layer ceramic battery includes a cathode current collector, the cathode active material layer may be disposed on one or both surfaces of the cathode current collector. When the multi-layer ceramic battery includes an anode current collector, the anode active material layer may be disposed on one or both surfaces of the anode current collector. When the multilayer ceramic battery further includes a cathode current collector and/or an anode current collector, high-rate characteristics of the battery may be further improved.

In the multi-layer ceramic battery, unit cells can be stacked by providing a current collector layer on one or both of the uppermost layer and the lowermost layer of a laminate or by providing a current collector layer such as a metal layer within the laminate.

The multi-layer ceramic battery or the thin-film battery is, for example, a small or ultra-small battery applicable as an application power source for Internet of Things (IoT) or a power source of a wearable device.

The multilayer ceramic battery or the thin-film battery may also be used in medium and large-sized batteries such as an electric vehicle (EV) and an energy storage system (ESS).

In an embodiment, the secondary battery is a multi-layer ceramic solid battery including first and second unit cells each having sequentially stacked cathode layer, solid electrolyte layer and anode layer and an inner current collector positioned between the first and second unit cells so as to contact the cathode layer of each of the first and second unit cells or contact the anode layer of each of the first and second unit cells.

The anode active material of the anode active material layer can comprise $Li_{4/3}Ti_{5/3}O_4$, $LiTiO_2$, $LiM1_sM2_tO_u$ (M1 and M2 are each independently a transition metal and s, t, and u are each independently any positive number), $TiO_x$ ($0<x\leq3$), $Li_xV_2(PO_4)_3$ ($0<x\leq5$), or a combination thereof. The anode active material is particularly $Li_{4/3}Ti_{5/3}O_4$ or $LiTiO_2$.

The current collector layer may be a cathode current collector, an anode current collector, or an inner current collector layer between adjacent unit cells. The current collector layer may be made of any suitable metal, such as Ni, Cu, Ag, Pd, Au, or Pt. The current collector layer may be made of an alloy including any of Ni, Cu, Ag, Pd, Au, or Pt. The alloy may be an alloy including two or more of Ni, Cu, Ag, Pd, Au, or Pt. The alloy may be, for example, an Ag/Pd alloy. Such metal and alloy may be singular or a mixture of two or more thereof. The current collector layer as a cathode current collector and the current collector layer as an anode current collector may use the same material, or may use different materials from each other. In an alloy or mixture powder including Ag and Pd, since the melting point thereof may be continuously changed from the melting point of silver (962° C.) to the melting point (1550° C.) of palladium by the mixing ratio thereof, it is possible to select the melting point according to the batch firing temperature, and it is possible to suppress an increase in the internal resistance of the battery by allowing the alloy or mixture powder to have a high electronic conductivity.

The solid electrolyte or the solid electrolyte layer can contain an ion conductive inorganic material, and for example, an oxide-based solid electrolyte may be used as the solid electrolyte.

The oxide-based solid electrolyte is, for example, $Li_{1+x+y}Al_xTi_{2-x}Si_yP_{3-y}O_{12}$ ($0<x<2$, $0\leq y<3$), $BaTiO_3$, $Pb(Zr_xTi_{1-x})O_3$ (PZT) ($0\leq x\leq1$), $Pb_{1-x}La_xZr_{1-y}Ti_yO_3$ (PLZT) ($0\leq x<1$, $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $Li_{1+x+y}(Al_aGa_{1-a})_x(Ti_bGe_{1-b})_{2-x}Si_yP_{3-y}O_{12}$ ($0\leq x\leq1$, $0\leq y\leq1$, $0\leq a\leq1$, and $0\leq b\leq1$), lithium lanthanum titanate ($Li_xLa_yTiO_3$, $0<x<$, $0<y<3$), lithium germanium thiophosphate ($Li_xGe_yP_zS_w$, $0<x<4$, $0<y<1$, $0<z<1$, $0<w<5$), lithium nitride-based glass ($Li_xN_y$, $0<x<4$, $0<y<2$), $SiS_2$($Li_xSi_yS_z$, $0<x<3$, $0<y<2$, $0<z<4$), a $P_2S_5$-based glass ($Li_xP_yS_z$, $0<x<3$, $0<y<3$, $0<z<7$), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, a Garnet-type ceramics of the formula $Li_{3+x}La_3M_2O_{12}$ (where M=Te, Nb, Zr, or a combination thereof) (x is an integer of 1 to 10), or a combination thereof.

In an embodiment, the solid electrolyte is a lithium compound comprising $Li_{3.25}Al_{0.25}SiO_4$, $Li_3PO_4$, $LiP_xSi_yO_z$ (x, y, z are each independently any positive number), or a combination thereof. The solid electrolyte is, for example, $Li_{3.5}P_{0.5}Si_{0.5}O_4$.

Figure 4:
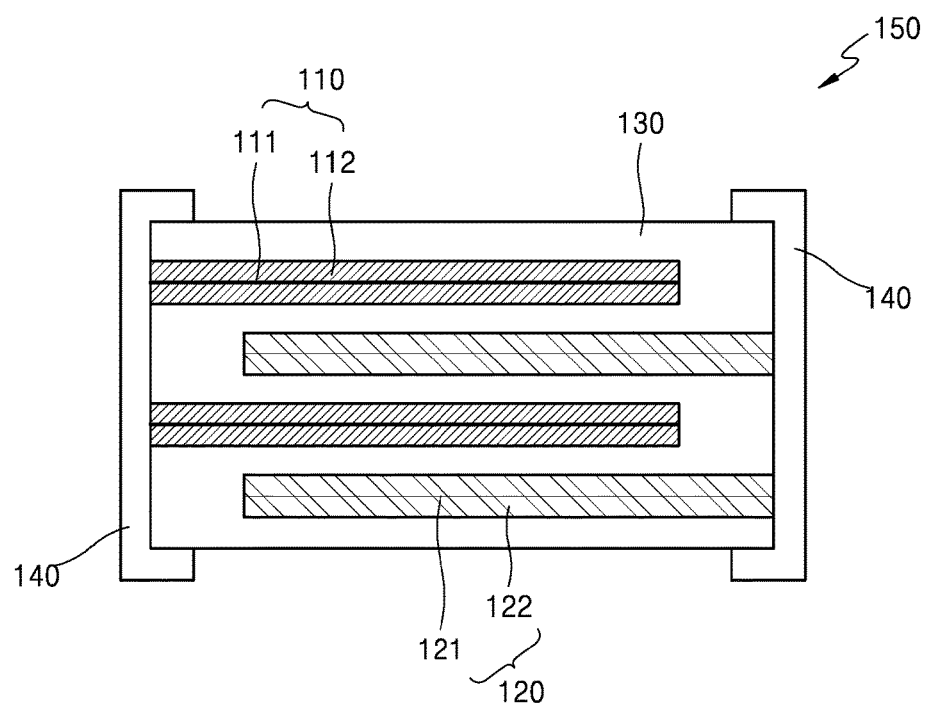
FIG. 4 schematically illustrates an embodiment of a structure of a multi-layer ceramic battery.

FIG. 4 schematically illustrates an embodiment of a cross-sectional structure of a multi-layer ceramic (MLC) battery.

Referring to FIG. 4, the MLC battery may be manufactured by sequentially stacking an anode, a solid electrolyte, and a cathode and then simultaneously heat-treating them.

Referring to FIG. 4, cathode active material layers 112 containing the cathode active material according to an embodiment are disposed on one or both surfaces of a cathode current collector 111 to form a cathode 110. Anode active material layers 122 are stacked on one or both surfaces of an anode current collector 121 to form an anode 120. A solid electrolyte 130 is disposed between the cathode 110 and the anode 120. External electrodes 140 are formed on both ends of a battery body 150. The external electrodes 140 are connected to the cathode 110 and the anode 120. The ends of the external electrodes 140 are exposed to the outside of the battery body 150, and thus serve as external terminals for electrically connecting the cathode 110 and the anode 120 with an external device. Any one of a pair of external electrodes 140 is connected to the cathode 110 whose one end is exposed to the outside of the battery body 150, and the other one thereof is connected to the anode 120 whose other end is exposed to the outside of the battery body 150.

Figure 5:
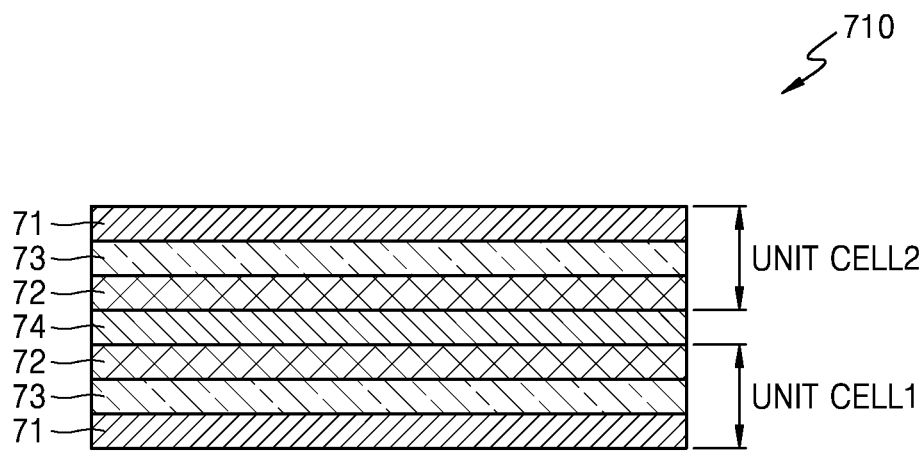
FIGS. 5 and 6 schematically illustrate embodiments of structures of secondary batteries.
Figure 6:
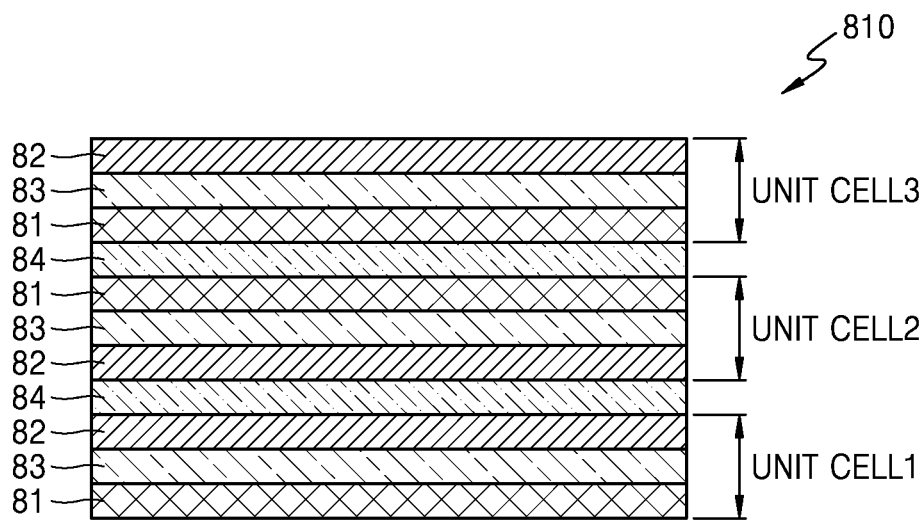

FIGS. 5 and 6 schematically illustrate embodiments of cross-sectional structures of secondary batteries.

As shown in FIG. 5, in a multi-layer ceramic solid battery 710, a unit cell 1 and a unit cell 2 are stacked through an inner current collector layer 74. Each of the unit cell 1 and the unit cell 2 is composed of a cathode layer 71, a solid electrolyte layer 73, and an anode layer 72, which are sequentially stacked.

The cathode layer 71 contains the cathode active material according to an embodiment.

The unit cell 1, the unit cell 2, and the inner current collector layer 74 are stacked such that the anode layer 72 of the unit cell 2 is adjacent to one side surface (upper surface in FIG. 5) of the inner current collector layer 74 and the anode layer 72 of the unit cell 1 is adjacent to the other side surface (lower surface in FIG. 5) of the inner current collector layer 74.

Although it is shown in FIG. 5 that the inner current collector layer 74 is disposed to contact the anode layer 72 of each of the unit cell 1 and the unit cell 2, the inner current collector layer 74 may be disposed to contact the cathode layer 71 of each of the unit cell 1 and the unit cell 2. The inner current collector layer 74 includes an electroconductive material.

The inner current collector layer 74 may further include an ion-conductive material. When the inner current collector layer 74 further includes an ion-conductive material, voltage stabilization characteristics can be improved.

Since the same pole is disposed on both sides of the inner current collector layer 74 in the multi-layer ceramic solid battery 710, a monopolar multi-layer ceramic solid battery 710 in which a plurality of unit cells are connected in parallel through an inner current collector layer 74 can be obtained. Thereby, a high-capacity multi-layer ceramic solid battery 710 may be obtained.

In the multi-layer ceramic solid battery 710, since the inner current collector layer 74, which is interposed between the unit cell 1 and the unit cell 2, includes an electroconductive material, the two adjacent unit cells may be electrically connected in parallel to each other, and in the two adjacent unit cells, the cathode layer 71 or the anode layer 72 may be ionically connected. Thereby, the potential of the anode layer 71 or the cathode layer 72 adjacent to each other may be averaged, so that a stable output voltage may be obtained.

In addition, the unit cells constituting the multi-layer ceramic solid battery 10 may be electrically connected in parallel by eliminating an external current collecting member such as a tab. Thereby, a multi-layer ceramic solid battery 710 excellent in space utilization rate and cost-effectiveness may be obtained.

Referring to FIG. 6, a laminate includes a cathode layer 81, an anode layer 82, a solid electrolyte layer 83, and an inner current collector layer 84. Such a laminate is thermally pressed to obtain a ceramic solid battery laminate 810. The cathode layer 81 is composed of one sheet for the cathode layer, and the anode layer 82 is composed of two sheets for the anode layer. The cathode layer 81 contains the cathode active material according to an embodiment.

Figure 7A:
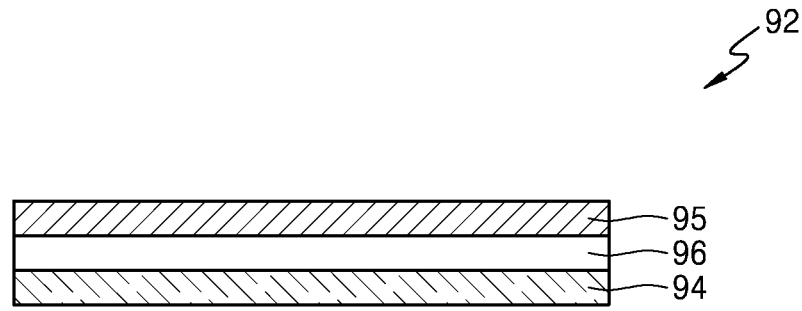
FIGS. 7A and 7B schematically illustrate embodiments of structures of secondary batteries.
Figure 7B:
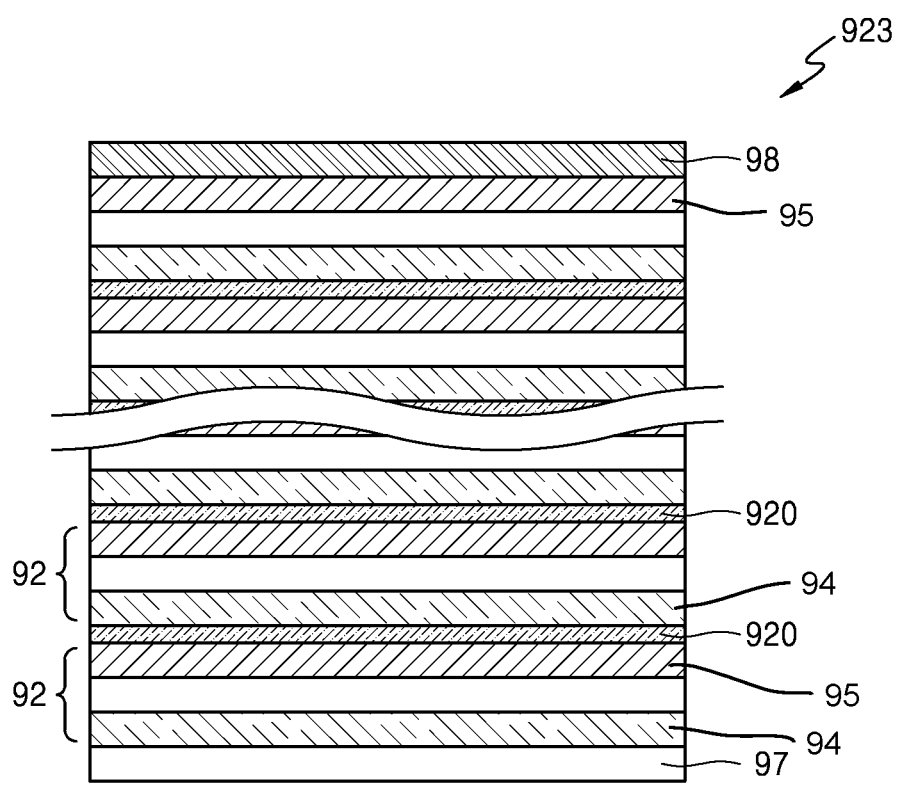

FIGS. 7A and 7B schematically illustrate structures of secondary batteries according to other embodiments. Each of the cathode active material layers of FIGS. 7A and 7B includes the cathode active material according to an embodiment.

The structure of the most basic unit cell 92 constituting an all-solid secondary battery is shown with reference to FIG. 7A. The unit cell 92 has a structure in which a cathode active material layer 94, a solid electrolyte layer 96, and an anode active material layer 95 are sequentially stacked.

FIG. 7B shows the structure of a laminate 923 constituting an all-solid secondary battery.

The all-solid secondary battery is provided with a cathode extraction electrode contacting a cathode active material layer at the lower end thereof, and is provided with an anode extraction electrode contacting an anode active material layer at the upper end thereof. In this specification, the upper end and the lower end indicate a relative positional relationship.

Referring to FIG. 7B, the laminate 923 has a structure in which a plurality of unit cells 92 are stacked such that the cathode active material 94 and anode active material 95 of each of the unit cells 92 face each other and the uppermost layer and the lowermost layer of the laminate 923 are provided with current collector layers. Any one of the uppermost current collector layer and the lowermost current collector layer is connected to a cathode active material layer to become a cathode current collector, and the other thereof is connected to an anode active material layer to become an anode current collector. The lowermost current collector layer 97 comes into contact with the cathode active material layer 94 to become a cathode current collector, and the uppermost current collector layer 98 comes into contact with the anode active material layer 95 to become an anode current collector. The current collector layer may function as an extraction electrode.

In FIG. 7B, the lowermost current collector layer 97 may function as a cathode extraction electrode, and the uppermost current collector layer 98 may function as an anode extraction electrode. Alternatively, an extraction electrode may be separately provided on the current collector layer. For example, a cathode extraction electrode contacting the current collector layer 97 may be provided at the lower end of the current collector layer 97, and an anode extraction electrode contacting the current collector layer 98 may be provided at the upper end of the current collector layer 98.

In FIG. 7B, the laminate 923 has a structure in which a metal layer 920 is between the unit cells 92. Since the metal layer 920 is between the unit cells 92, the movement of ions stays within individual cell units, the laminate 923 may function as a series-type all-solid secondary battery. Although the laminate 923 of FIG. 7B has a current collector layer, the current collector layer is optional as described above.

In the laminate 923 of the all-solid secondary battery, when the number of unit cells 92 is two or more, a so-called series-type all-solid secondary battery may be formed. The number of unit cells may be selected based on the desired capacity or voltage of an all-solid-state secondary battery.

Alternatively, the secondary battery is, for example, an all-solid secondary battery including: a cathode layer including a cathode active material layer; an anode layer including an anode current collector and a first anode active material layer or a third anode active material layer; and a solid electrolyte layer between the cathode layer and the anode layer, wherein the cathode active material layer includes a cathode active material including a compound represented by Formula 1 below:

$$Li_x(Co_{1-y}M_y)_z(P_2O_7)_4 \quad \text{Formula 1}$$

wherein, in Formula 1, $5 \leq x \leq 7$, $0.01 \leq y \leq 0.1$, and $4 \leq z \leq 6$, and M is a Group 3 to 11 element belonging to 5th and 6th periods in the Periodic Table of the Elements, or a combination thereof.

The first anode active material layer includes a carbon-based anode active material, a metal or metalloid anode active material, or a combination thereof.

The carbon-based anode active material includes amorphous carbon, crystalline carbon, or a combination thereof, and the metal or metalloid anode active material includes gold (Au), platinum (Pt), palladium (Pd), silicon (Si), silver (Ag), aluminum (Al), bismuth (Bi), tin (Sn), zinc (Zn), or a combination thereof.

The all-solid-state secondary battery can further include a second anode active material layer disposed between the anode current collector and the first anode active material layer and/or between the solid electrolyte layer and the first anode active material layer. The second anode active material layer is a metal layer including lithium or a lithium alloy.

In the all-solid secondary battery, for example, the third anode active material layer is a metal layer including lithium or a lithium alloy.

Figure 8:
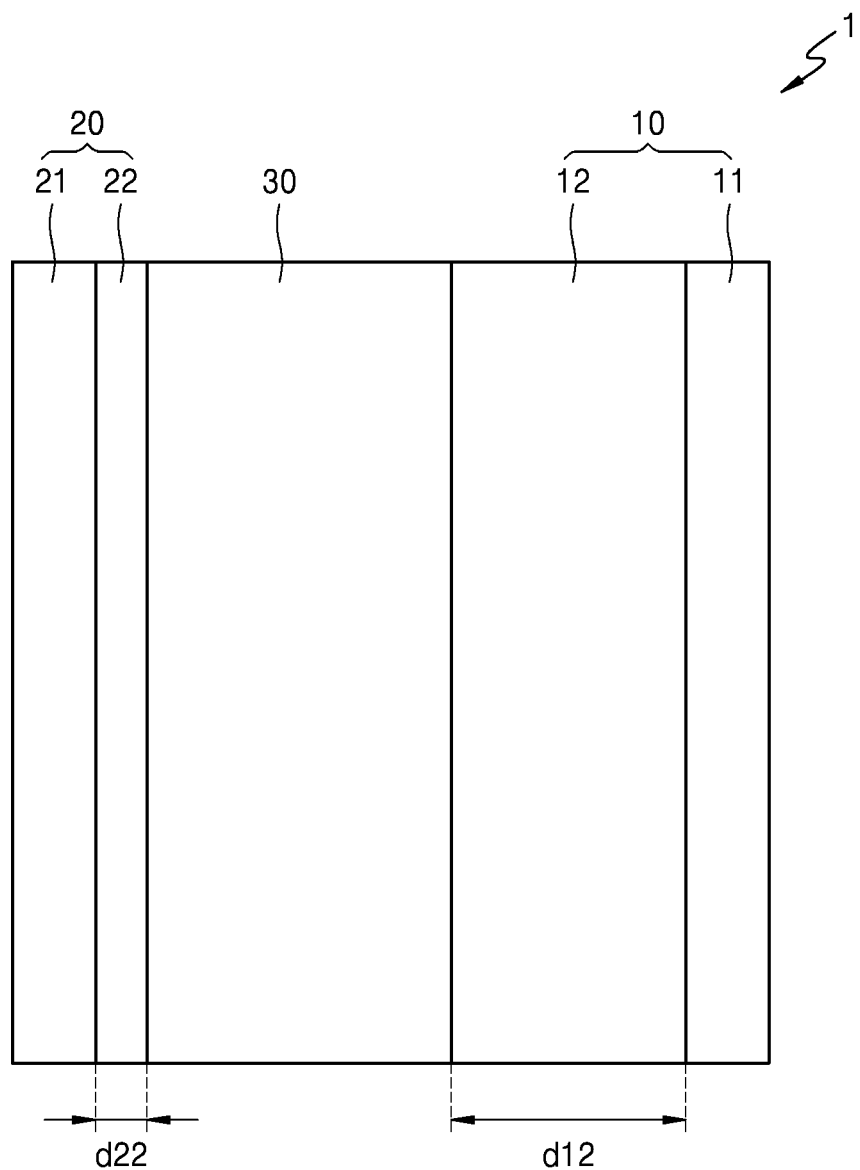
FIGS. 8 to 10 schematically illustrate embodiments of structures of all-solid secondary batteries.
Figure 9:
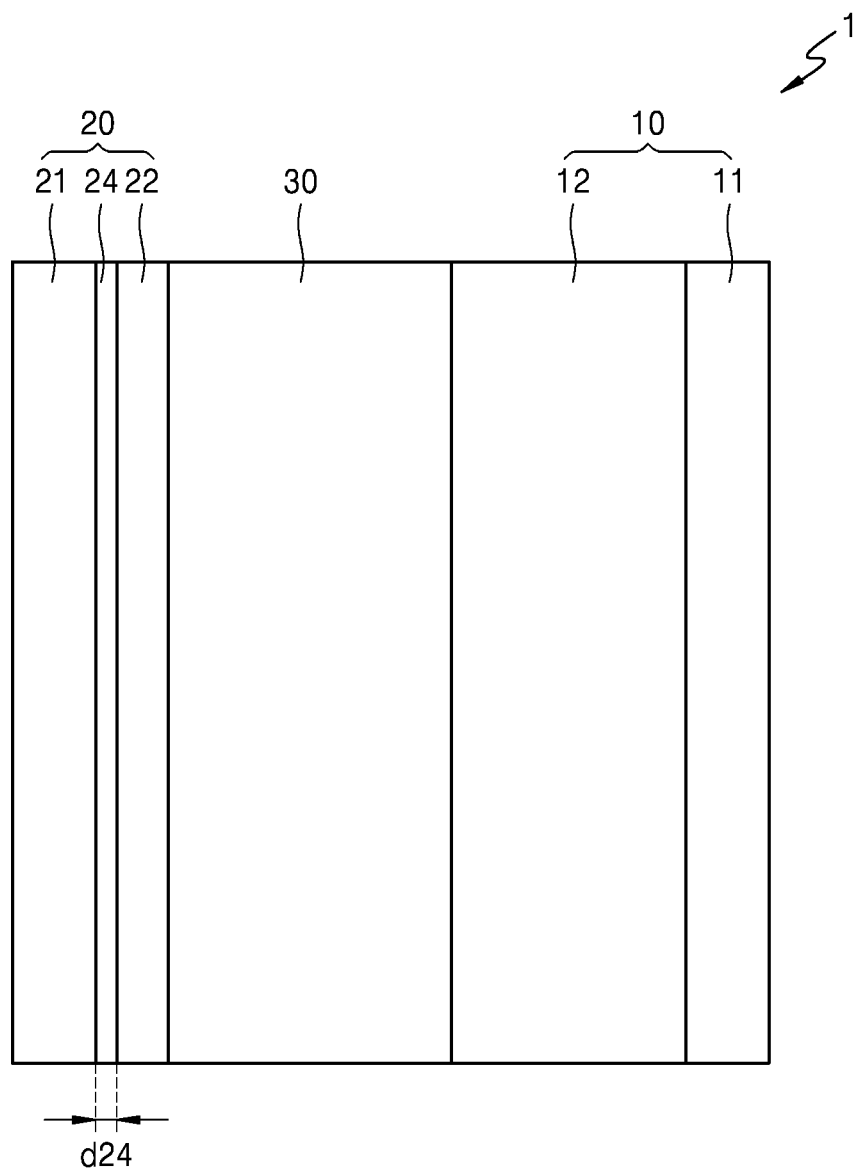
Figure 10:
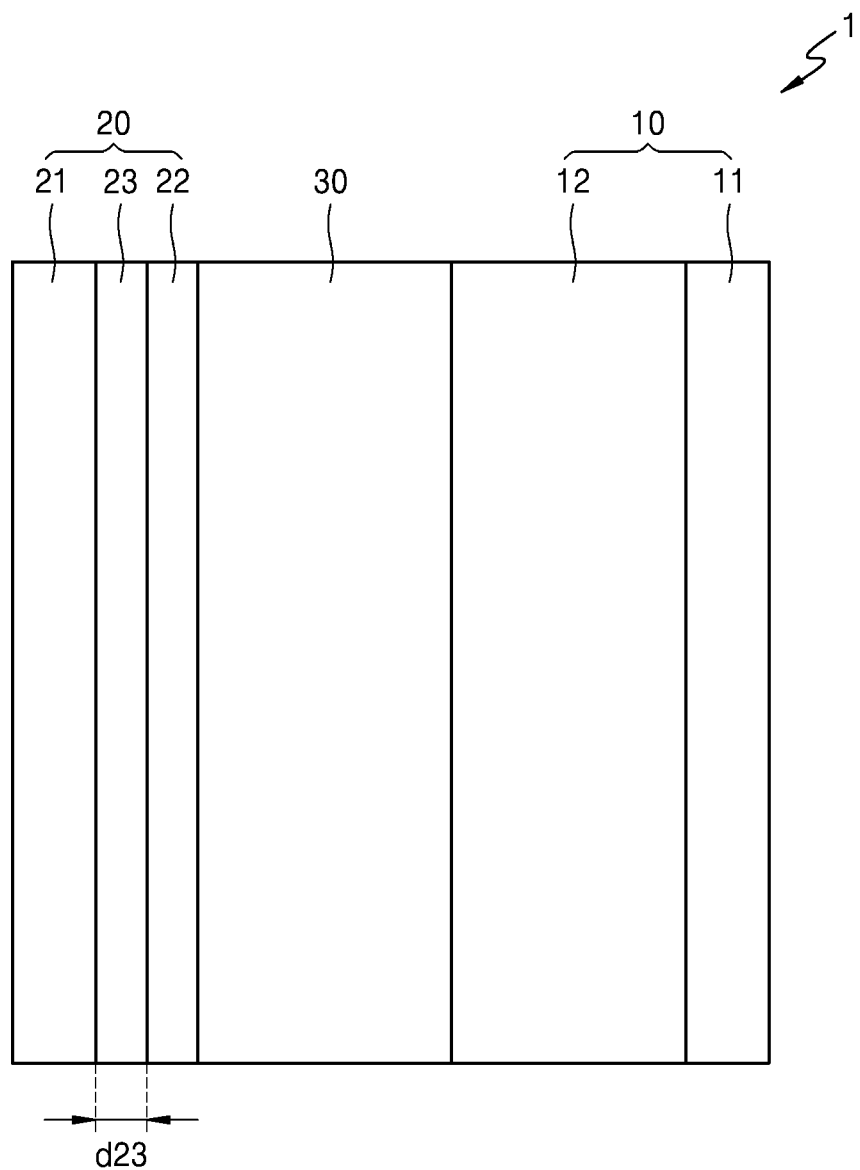

Referring to FIGS. 8 to 10, an all-solid secondary battery 1 includes an anode layer 20 including an anode current collector layer 21 and a first anode active material layer 22; a cathode layer 10 including a cathode current collector layer 11 and a cathode active material layer 12; and a solid electrolyte layer 30 between the cathode layer 20 and the anode layer 10. The cathode layer 10 may contain a solid electrolyte. The cathode active material layer 12 of FIGS. 8 to 10 includes the cathode active material according to an embodiment. The cathode layer may contain, for example, the cathode active material, solid electrolyte, and conductive material.

Anode Layer

Referring to FIGS. 8 to 10, the anode layer 20 includes an anode current collector layer 21 and a first anode active material layer 22, and the first anode active material layer 22 includes an anode active material. The anode current collector layer 21 may be omitted.

The anode active material included in the first anode active material layer 22 has, for example, a particle shape. The average particle diameter of the anode active material having a particle shape is, for example, about 4 μm or less, about 3 μm or less, about 2 μm or less, about 1 μm or less, or about 900 nm or less. The average particle diameter of the anode active material having a particle shape is, for example, about 10 nm to about 4 μm, about 10 nm to about 3 μm, about 10 nm to about 2 μm, about 10 nm to about 1 μm, or about 10 nm to about 900 nm. When the anode active material has an average particle diameter in these ranges, it may be easier to reversibly absorb and/or desorb lithium during charging and discharging. The average particle diameter of the anode active material is, for example, a median diameter (D50) measured using a laser particle size distribution meter.

The anode active material included in the first anode active material layer 22 includes, for example, a carbon-based anode active material, a metal or metalloid anode active material, or a combination thereof.

In particular, the carbon-based anode active material is amorphous carbon. Examples of the amorphous carbon include, but are not limited to, carbon black (CB), acetylene black (AB), furnace black (FB), ketjen black (KB), graphene, carbon nanotube, and carbon nanofiber. Any amorphous carbon may be used as long as it is classified as amorphous carbon in the art. Amorphous carbon has no crystallinity or very low crystallinity, and is distinguished from crystalline carbon or graphite-based carbon.

The metal or metalloid anode active material may include gold (Au), platinum (Pt), palladium (Pd), silicon (Si), silver (Ag), aluminum (Al), bismuth (Bi), tin (Sn), zinc (Zn), or a combination thereof, but is not limited thereto, and any metal anode active material or any metalloid anode active material may be used as long as it forms an alloy or a compound with lithium in the art. For example, nickel (Ni) is not a metal anode active material because it does not form an alloy with lithium.

The first anode active material layer 22 includes a kind of anode active material among such anode active materials, or a mixture of a plurality of different anode active materials among such anode active materials. For example, the first anode active material layer 22 includes only amorphous carbon, or includes gold (Au), platinum (Pt), palladium (Pd), silicon (Si), silver (Ag), aluminum (Al), bismuth (Bi), tin (Sn), zinc (Zn), or a combination thereof. Alternatively, the first anode active material layer 22 includes a mixture of amorphous carbon and a metal or metalloid anode active material comprising gold (Au), platinum (Pt), palladium (Pd), silicon (Si), silver (Ag), aluminum (Al), bismuth (Bi), tin (Sn), zinc (Zn), or a combination thereof. The mixing ratio of a mixture of amorphous carbon and gold or the like is, for example, about 10:1 to about 1:2, about 5:1 to about 1:1, or about 4:1 to about 2:1 by a weight ratio, but is not necessarily limited to this range and is selected according to the desired characteristics of the all-solid secondary battery 1. As the anode active material has such a composition, the cycle characteristics of the all-solid secondary battery 1 can be further improved.

The anode active material included in the first anode active material layer 22 includes, for example, a mixture of first particles made of amorphous carbon and second particles made of metal or metalloid. Examples of metals or metalloids include gold (Au), platinum (Pt), palladium (Pd), silicon (Si), silver (Ag), aluminum (Al), bismuth (Bi), tin (Sn), zinc (Zn), or a combination thereof. Metalloids are otherwise semiconductors. The content of the second particles is about 8 wt % to about 60 wt %, about 10 wt % to about 50 wt %, about 15 wt % to about 40 wt %, or about 20 wt % to about 30 wt % based on the total weight of the mixture. When the content of the second particles is within the above range, for example, the cycle characteristics of the all-solid secondary battery 1 can be further improved.

The first anode active material layer 22 may further include, for example, a binder. Examples of the binder include, but are limited to, styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, and polymethyl methacrylate. Any binder may be used as long as it is used in the art. The binder may be used alone or in a combination of a plurality of different binders.

When the first anode active material layer 22 includes a binder, the first anode active material layer 22 can be stabilized on the anode current collector 21. Further, cracking of the first anode active material layer 22 may be suppressed despite a change in volume and/or a change in relative position of the first anode active material layer 22 during the charging/discharging process. For example, when the first anode active material layer 22 does not include a binder, it is possible for the first anode active material layer 22 to be easily separated from the anode current collector 21. The portion where the first anode active material layer 22 is separated from the anode current collector 21 can be exposed to the anode current collector 21 and come into contact with the solid electrolyte layer 30, thereby increasing the possibility of a short circuit. The first anode active material layer 22 is prepared by applying a slurry, in which a material constituting the first anode active material layer 22 is dispersed, onto the anode current collector 21 and drying the slurry. Since the binder is included in the first anode active material layer 22, it is possible to stably disperse the anode active material in the slurry. For example, when the slurry is applied onto the anode current collector 21 by a screen printing method, it is possible to suppress the clogging of a screen (for example, clogging by the agglomerate of the anode active material).

The thickness d22 of the first anode active material layer 22 is, for example, about 50% or less, about 40% or less, about 30% or less, about 20% or less, about 10% or less, or about 5% or less of the thickness d12 of the cathode active material layer 12. The thickness d22 of the first anode active material layer 22 is, for example, about 1 micrometer (μm) to about 20 μm, about 2 μm to about 10 μm, or about 3 μm to about 7 μm. When the thickness d22 of the first anode active material layer 22 is within the above ranges, the cycle characteristics of the all-solid secondary battery 1 are excellent.

The charge capacity of the first anode active material layer 22 is, for example, about 50% or less, about 40% or less, about 30% or less, about 20% or less, about 10% or less, about 5% or less, or about 2% or less compared to the charge capacity of the cathode active material layer 12. The charge capacity of the first anode active material layer 22 is, for example, about 0.1% to about 50%, about 0.1% to about 40%, about 0.1% to about 30%, about 0.1% to about 20%, about 0.1% to about 10%, about 0.1% to about 5%, or about 0.1% to about 2% compared to the charge capacity of the cathode active material layer 12. When the charge capacity of the first anode active material layer 22 is within the above ranges, the cycle characteristics of the all-solid-state secondary battery 1 are excellent. The charge capacity of the cathode active material layer 12 is obtained by multiplying the charge specific capacity (mAh/g) of the cathode active material by the mass of the cathode active material in the cathode active material layer 12. The anode current collector 21 is made of, for example, a material that does not react with lithium, that is, does not form either an alloy or a compound with lithium. Examples of the material constituting the anode current collector 21 may include, but are not limited to, copper (Cu), stainless steel, titanium (Ti), iron (Fe), cobalt (Co), nickel (Ni), or a combination thereof. Any suitable material may be used as long as it is used as a current collector in the art. The anode current collector 21 may be made of one of the above-described metals, or may be made of an alloy or a coating material of the above-described metals. The anode current collector 21 has, for example, a plate shape or a foil shape.

The first anode active material layer 22 may further include additives such as a filler, a dispersant, an ion conducting agent used in all-solid secondary batteries, or a combination thereof.

Referring to FIG. 9, the all-solid secondary battery 1 further includes, for example, a thin film 24 including an element capable of forming an alloy with lithium on the anode current collector 21. The thin film 24 is disposed between the anode current collector 21 and the first anode active material layer 22. The thin film 24 includes, for example, an element capable of forming an alloy with lithium. Examples of the element capable of forming an alloy with lithium include, but are not limited to, gold, silver, zinc, tin, indium, silicon, aluminum, and bismuth. Any element may be used as long as it may form an alloy with lithium. The thin film 24 is formed of one of these metals, or is formed of an alloy of several kinds of metals. Since the thin film 24 is disposed on the anode current collector 21, for example, the deposition form of the second anode active material layer (not shown) deposited between the thin film 24 and the first anode active material layer 22 may be further flattened, and the cycle characteristics of the all-solid secondary battery 1 may be further improved.

The thickness d24 of the thin film 24 is, for example, about 1 nm to about 800 nm, about 10 nm to about 700 nm, about 50 nm to about 600 nm, or about 100 nm to about 500 nm. When the thickness of the thin film 24 is within the above ranges, the energy density and cycle characteristics of the all-solid-state battery are excellent. The thin film 24 may be disposed on the anode current collector 21 by, for example, a vacuum deposition method, a sputtering method, or a plating method, but the deposition method thereof is not limited to these methods, and any method capable of forming the thin film 24 in the art may be used.

Referring to FIG. 10, the all-solid secondary battery 1 further includes a second anode active material layer 23 disposed between the anode current collector 21 and the solid electrolyte layer 30 by charging. The all-solid secondary battery 1 further includes a second anode active material layer 23 disposed between the anode current collector 21 and the first anode active material layer 22 by charging. Although not shown in the drawings, the all-solid secondary battery 1 can further include a second anode active material layer 23 disposed between the solid electrolyte layer 30 and the first anode active material layer 22 by charging. Although not shown in the drawings, the all-solid-state secondary battery 1 may further include a second anode active material layer 23 disposed inside the first anode active material layer 22 by charging.

The second anode active material layer 23 is a metal layer including lithium or a lithium alloy. Accordingly, since the second anode active material layer 23 is a metal layer including lithium, it acts as, for example, a lithium reservoir. Examples of the lithium alloy include, but are not limited to, a Li—Al alloy, a Li—Sn alloy, a Li—In alloy, a Li—Ag alloy, a Li—Au alloy, a Li—Zn alloy, a Li—Ge alloy, and a Li—Si alloy. Any lithium alloy may be used as long as it is used in the art. The second anode active material layer 23 may be formed of one of these alloys or lithium, or may be formed of several kinds of alloys.

The thickness d23 of the second anode active material layer 23 is not particularly limited, and is, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness d23 of the second anode active material layer 23 is within the above ranges, the cycle characteristics of the all-solid secondary battery are excellent. The second anode active material layer 23 may be, for example, a metal foil having a thickness in these ranges.

In the all-solid-state secondary battery 1, the second anode active material layer 23 is disposed between the anode current collector 21 and the first anode active material layer 22 before assembly of the all-solid secondary battery 1, or is deposited between the anode current collector 21 and the first anode active material layer 22 by charging after assembly of the all-solid secondary battery 1.

When the second anode active material layer 23 is disposed between the anode current collector 21 and the first anode active material layer 22 before assembly of the all-solid secondary battery 1, the second anode active material layer 23 functions as a lithium reservoir because it is a metal layer containing lithium. The cycle characteristics of the all-solid secondary battery 1 including the second anode active material layer 23 can be further improved. For example, a lithium foil is disposed between the anode current collector 21 and the first anode active material layer 22 before assembly of the all-solid secondary battery 1.

When the second anode active material layer 23 is generated by charging after assembly of the all-solid secondary battery 1, the second anode active material layer 23 is not included during assembly of the all-solid secondary battery 1, so that the energy density of the solid secondary battery 1 is increased. For example, when the all-solid secondary battery 1 is charged, the all-solid secondary battery 1 is charged to exceed the charge capacity of the first anode active material layer 22. That is, the first anode active material layer 22 is overcharged. At the initial stage of charging, lithium is absorbed in the first anode active material layer 22. That is, the anode active material included in the first anode active material layer 22 forms an alloy or compound with lithium ions that have migrated from the cathode layer 10. When the all-solid secondary battery 1 is charged to exceed the charge capacity of the first anode active material layer 22, for example, lithium is deposited on the rear surface of the first anode active material layer 22, that is, between the anode current collector 21 and the first anode active material layer 22, and a metal layer corresponding to the second anode active material layer 23 is formed by the deposited lithium. The second anode active material layer 23 is a metal layer mainly containing lithium (that is, metal lithium). Such a result is obtained when the anode active material included in the first anode active material layer 22 is made of a material that forms an alloy or compound with lithium. During discharging, lithium in the first anode active material layer 22 and the second anode active material layer 23, that is, metal layers is ionized and moves toward the cathode layer 10. Accordingly, in the all-solid secondary battery 1, it is possible to use lithium as an anode active material. Further, since the first anode active material layer 22 covers the second anode active material layer 23, it serves as a protective layer for the second anode active material layer 23, that is, a metal layer, and serves to suppress the deposition and growth of lithium dendrite. Therefore, the short circuit and capacity reduction of the all-solid secondary battery 1 are suppressed, and as a result, the cycle characteristics of the all-solid secondary battery 1 are improved. Further, when the second anode active material layer 23 is disposed by charging after assembly of the all-solid-state secondary battery 1, the anode current collector 21, the first anode active material layer 22 and the region therebetween are Li-free regions that do not contain lithium (Li) metal or lithium (Li) alloy in the initial state or post-discharge state of the all-solid secondary battery.

Referring to FIG. 10, the all-solid secondary battery 1 has a structure in which a second anode active material layer 23 is disposed on an anode current collector 21 and a solid electrolyte layer 30 is disposed directly on the first anode active material layer 22. The second anode active material layer 23 is, for example, a lithium metal layer or a lithium alloy layer.

Solid Electrolyte Layer

Referring to FIGS. 8 to 10, the solid electrolyte layer 30 may contain an oxide-based solid electrolyte.

The oxide-based solid electrolyte is $Li_{1+x+y}Al_xTi_{2-x}Si_yP_{3-y}O_{12}$ ($0<x<2$, $0\le y<3$), $BaTiO_3$, $Pb(Zr_xTi_{1-x})O_3$ (PZT) ($0\le x\le 1$), $Pb_{1-x}La_xZr_{1-y}Ti_yO_3$ (PLZT) ($0\le x<1$, $0\le y<1$), $PB(Mg_3Nb_{2/3})O_3-PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ ($0<x<2$, $0<y<3$), $Li_xAl_yTi_z(PO_4)_3$ ($0<x<2$, $0<y<1$, $0<z<3$), $Li_{1+x+y}(Al_aGa_{1-a})_x(Ti_bGe_{1-b})_{2-x}Si_yP_{3-y}O_{12}$ ($0\le x\le 1$, $0\le 01$, $0\le a\le 1$, and $0\le b\le 1$), $Li_xLa_yTiO_3$ ($0<x<2$, $0<y<3$), $Li_2O$, $LiOH$, $Li_2CO_3$, $LiAlO_2$, $Li_2O-Al_2O_3-SiO_2-P_2O_5-TiO_2-GeO_2$, $Li_{3+x}La_3M_2O_{12}$ (M=Te, Nb, Zr, or a combination thereof, and x is an integer of 1 to 10), or a combination thereof.

The oxide-based solid electrolyte is, for example, a garnet-type solid electrolyte comprising $Li_7La_3Zr_2O_{12}$(LLZO), $Li_{3+x}La_3Zr_{2-a}M_aO_{12}$ (M doped LLZO, M=Ga, W, Nb, Ta, or Al, or a combination thereof, and x is an integer of 1 to 10), or a combination thereof.

According to an embodiment, the solid electrolyte layer includes an LLZO solid electrolyte.

The solid electrolyte layer 30 may contain $Li_7La_3Zr_2O_{12}$ (LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, $Li_{5.39}Ga_{1.61}La_3Zr_{1.7}W_{0.3}O_{12}$, $Li_{6.5}La_3Zr_{1.5}Ta_{0.3}O_{12}$, or a combination thereof.

Cathode Layer

The cathode layer 10 includes a cathode current collector 11 and a cathode active material layer 12.

As the cathode current collector 11, a plate or foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or a combination thereof may be used. The cathode current collector 11 may be omitted.

The cathode active material layer 12 contains a cathode active material and optionally a solid electrolyte. The cathode active material may be a cathode active material according to an embodiment. The solid electrolyte included in the positive electrode layer 10 is similar to or different from the solid electrolyte included in the solid electrolyte layer 30. For details of the solid electrolyte, refer to those of the solid electrolyte layer 30. According to one embodiment, the solid electrolyte may include an oxide-based solid electrolyte.

The cathode layer 10 contains the cathode active material according to an embodiment.

The shape of the cathode active material is, for example, a particle shape such as a spherical sphere or an elliptical sphere. The particle diameter of the cathode active material is not particularly limited, and is within a range applicable to the cathode active material of an all-solid secondary battery. The content of the cathode active material in the cathode layer 10 is also not particularly limited, and is within a range applicable to the cathode layer of an all-solid secondary battery.

The cathode layer 10 may further include additives such as a conducting agent, a binder, a filler, a dispersant, an ion conductive auxiliary agent, or a combination thereof in addition to the cathode active material and solid electrolyte. Examples of the conducting agent include graphite, carbon black, acetylene black, ketjen black, carbon fiber, metal powder, or a combination thereof. Examples of the binder include styrene-butadiene rubber (SBR), polytetrafluoroethylene, polyvinylidene fluoride, polyethylene, or a combination thereof. As a coating agent, a dispersant, an ion conductive auxiliary agent, etc. that can be blended into the cathode layer 10, and other materials suitable for an electrode of a solid secondary battery can also be used.

In a method of manufacturing an all-solid secondary battery, a solid electrolyte layer 30 is stacked on a cathode layer 10, and an anode layer 20 is stacked on the solid electrolyte layer 30, thereby manufacturing the all-solid secondary battery.

According to another embodiment, the solid electrolyte layer 30 may be prepared in the form of a sheet by applying a composition for forming a solid electrolyte layer on a separate substrate, drying the composition and separating the dried composition from the substrate, or may be prepared in the form of a sheet including the substrate. As a non-limiting example, a polyethylene terephthalate film, a polyethylene nonwoven fabric or the like may be used as the substrate.

According to another embodiment, the solid electrolyte layer 30 may be formed by applying and drying or transferring the composition for forming the solid electrolyte layer on the cathode layer 10.

Then, the cathode layer, the solid electrolyte layer, and the anode layer are packaged with a packaging material, and then pressed to manufacture an all-solid battery. The pressing may be performed using roll press, hot press, warm isostatic press, or the like.

When the pressing is performed using roll press or hot press, mass production is possible, and a contact interface may be formed during the pressing process of the electrode layer and the solid electrolyte layer.

Preparation of Anode Layer

An anode active material, a conductive material, a binder, and a solid electrolyte, which are materials constituting a first anode active material layer 22, are added to a polar solvent or a non-polar solvent to prepare a slurry. The solid electrolyte may be omitted. The prepared slurry is applied onto an anode current collector 21 and dried to prepare a first laminate. Next, the dried first laminate is pressed to prepare an anode layer 20. The pressing is roll pressing or flat pressing, but is not limited thereto. Any pressing may be used as long as it is used in the art. The pressing process may be omitted.

The anode layer includes an anode current collector and a first anode active material layer containing an anode active material and is disposed on the anode current collector. The anode active material includes a carbon-based anode active material, a metal or metalloid anode active material, or a combination thereof. The carbon-based anode active material includes amorphous carbon, crystalline carbon, or a combination thereof. The metal or metalloid anode active material includes gold (Au), platinum (Pt), palladium (Pd), silicon (Si), silver (Ag), aluminum (Al), bismuth (Bi), tin (Sn), zinc (Zn), or a combination thereof.

The anode layer can further include a second anode active material layer disposed between the anode current collector and the first anode active material layer and/or between the solid electrolyte layer and the first anode active material layer, and the second anode active material layer may be a metal layer including lithium or a lithium alloy.

Preparation of Cathode Layer

A cathode active material, a conductive material, a binder, and a solid electrolyte, which are materials constituting a cathode active material layer 12, are added to a non-polar solvent to prepare a slurry. As the cathode active material, the cathode active material according to an embodiment may be used. The prepared slurry is applied on a cathode current collector 11 and dried to obtain a laminate. The obtained laminate may be pressed to prepare a cathode layer 10. The pressing is roll pressing or flat pressing, but is not limited thereto. Any pressing may be used as long as it is used in the art. The pressing process may be omitted. Alternatively, the cathode layer 10 is prepared by compact-molding a mixture of materials constituting the cathode active material layer 12 in a pellet form or extending (molding) the mixture in a sheet form. When the cathode layer 10 is prepared in this way, the cathode current collector 11 may be omitted.

Preparation of Solid Electrolyte Layer

The solid electrolyte layer 30 is prepared by a solid electrolyte formed of an oxide-based solid electrolyte material.

Manufacture of all-Solid Secondary Battery

The cathode layer 10, the anode layer 20, and the solid electrolyte layer 30, which have been prepared by the disclosed method, are laminated such that the solid electrolyte layer 30 is disposed between the cathode layer 10 and the anode layer 20, and then pressed, thereby manufacturing the all-solid secondary battery 1.

For example, the solid electrolyte layer 30 is disposed on the cathode layer 10 to prepare a second laminate. Subsequently, the anode layer 20 is disposed on the second laminate such that the solid electrolyte layer 30 and the first anode active material layer contact each other, thereby manufacturing the all-solid secondary battery 1.

The disclosed configuration and manufacturing method of the all-solid-state secondary battery 1 is an example of the embodiment, and structural members, manufacturing procedures, and the like may be appropriately changed.

The all-solid-state secondary battery 1 may be used in a small intelligent transportation system (ITS) or a large electric vehicle according to the capacity and size of the battery.

The compound represented by Formula 1 according to another embodiment may be prepared by a wet or dry method. Hereinafter, a method of preparing the compound of Formula 1 according to a dry method will be further described.

First, a lithium precursor, a cobalt precursor, a phosphorus precursor, and an M precursor are mixed to obtain a precursor mixture.

The mixing may be performed by mechanical milling. In the case of mechanical milling, a solvent may be added as desired. The solvent may be, for example, acetone, ethanol, water, ethylene glycol, isopropanol, or a combination thereof. The content of the solvent is in the range of about 50 parts by weight to about 1,000 parts by weight, for example about 100 parts by weight to about 300 parts by weight, based on 100 parts by weight of the total weight of the precursor mixture. When the solvent is added, the mixing of the respective precursors may be made more uniform.

The mechanical milling may be performed according to methods known in the art.

The mechanical milling may be performed using a ball mill, an air jet mill, a bead mill, a roll mill, a planetary mill, or the like.

The lithium precursor may be lithium oxide, lithium carbonate, lithium chloride, lithium sulfide, lithium nitrate ($LiNO_3$), lithium phosphate, lithium hydroxide, or a combination thereof.

Examples of the cobalt precursor include cobalt oxide, cobalt sulfate, cobalt hydroxide, cobalt nitrate, cobalt oxalate, or a combination thereof.

Examples of the phosphorus precursor include $(NH_4)_2HPO_4$, $(NH_4)H_2PO_4$, $LiPO_3$, $LiH_2PO_4$, or a combination thereof.

Examples of the M precursor include oxide containing element M, carbonate containing element M, chloride containing element M, phosphate containing element M, hydroxide containing element M, nitrate containing element M, hydroxide containing element M, oxalate containing element M, or combinations thereof.

Examples of the M precursor include niobium oxide, niobium sulfate, niobium hydroxide, niobium nitrate, niobium oxalate, molybdenum oxide, molybdenum sulfate, molybdenum hydroxide, molybdenum nitrate, molybdenum oxalate, tantalum oxide, tantalum sulfate, tantalum hydroxide, tantalum nitrate, tantalum oxalate, tungsten oxide, tungsten sulfate, tungsten hydroxide, tungsten nitrate, tungsten oxalate, or a combination thereof.

Examples of the phosphorus (P) precursor include $(NH_4)_2HPO_4$, $(NH_4)H_2PO_4$, $LiPO_3$, $LiH_2PO_4$, or a combination thereof.

After performing the mixing, the resultant obtained may be heat-treated to obtain a compound represented by Formula 1. The heat treatment is performed, for example, at about 500° C. to about 1000° C., about 550° C. to about 900° C., or about 650° C. to about 750° C. The heat treatment is performed under an inert gas atmosphere or an oxidizing gas atmosphere. The inert gas atmosphere uses an inert gas such as argon or nitrogen. The oxidizing gas atmosphere uses an oxidizing gas such as air or an inert gas containing oxygen. During the heat treatment, a temperature increase rate is about 1° C./min to about 10° C./min. The heat treatment time is about 1 hour to about 48 hours, about 6 hours to about 24 hours, or about 6 hours to about 18 hours.

Before the heat treatment process, a drying process may be optionally performed. When the drying process is performed, the drying process is performed at about 30° C. to about 150° C., about 50° C. to about 130° C., about 60° C. to about 120° C., or about 80° C. to about 100° C. When the drying process is performed in this way, a cathode active material having better energy density may be obtained.

Alternatively, the compound of Formula 1 may be prepared using a liquid phase method in addition to the solid phase method.

Hereinafter, the present disclosure will be described in detail with reference to Examples and Comparative Examples, but the scope of the present disclosure is not limited to these Examples.

EXAMPLES

Preparation of Cathode Active Material

Preparation Example 1

$Li_2CO_3$, CoO, $Nb_2O_5$, and $(NH_4)_2HPO_4$ were mixed to obtain a precursor mixture, and ethanol was added to the precursor mixture, followed by ball-milling for 10 hours. The contents of $Li_2CO_3$, CoO, $Nb_2O_5$, and $(NH_4)_2HPO_4$ were stoichiometrically controlled so as to obtain a cathode active material having the composition as shown in Table 1 below, and ethanol was used in an amount of 100 parts by weight based on 100 parts by weight of the total content of $Li_2CO_3$, CoO, $Nb_2O_5$, and $(NH_4)_2HPO_4$.

The milled resultant product was dried at 90° C. for 12 hours, and the dried product was heat-treated at 750° C. for 12 hours in an air atmosphere to obtain a cathode active material $Li_6Co_{4.95}Nb_{0.05}(P_2O_7)_4$.

Preparation Example 2

A cathode active material having the composition as shown in Table 1 below was obtained in the same manner as in Preparation Example 1, except that WO3 was used instead of $Nb_2O_5$ in the preparation of the precursor mixture.

Preparation Example 3

A cathode active material having the composition as shown in Table 1 below was obtained in the same manner as in Preparation Example 1, except that $MoO_2$ was used instead of $Nb_2O_5$ in the preparation of the precursor mixture.

Preparation Example 4

A cathode active material having the composition as shown in Table 1 below was obtained in the same manner as in Preparation Example 1, except that $Ta_2O_5$ was used instead of $Nb_2O_5$ in the preparation of the precursor mixture.

Preparation Example 5

A cathode active material $Li_6Co_{4.90}Nb_{0.10}(P_2O_7)_4$ having the composition as shown in Table 1 below was obtained in the same manner as in Preparation Example 1, except that the contents of $Li_2CO_3$, CoO, $Nb_2O_5$, and $(NH_4)_2HPO_4$ were stoichiometrically controlled so as to obtain a target product having the composition as shown in Table 1 below in the preparation of the precursor mixture.

Preparation Example 6

A cathode active material having the composition as shown in Table 1 below was obtained in the same manner as in Preparation Example 5, except that WO3 was used instead of $Nb_2O_5$ in the preparation of the precursor mixture.

Preparation Example 7

A cathode active material having the composition as shown in Table 1 below was obtained in the same manner as in Preparation Example 5, except that $MoO_2$ was used instead of $Nb_2O_5$ in the preparation of the precursor mixture.

Preparation Example 8

A cathode active material having the composition as shown in Table 1 below was obtained in the same manner as in Preparation Example 5, except that $Ta_2O_5$ was used instead of $Nb_2O_5$ in the preparation of the precursor mixture.

Preparation Example 9

A cathode active material $Li_6Co_{4.75}Nb_{0.25}(P_2O_7)_4$ having the composition as shown in Table 1 below was obtained in the same manner as in Preparation Example 1, except that the contents of $Li_2CO_3$, CoO, $Nb_2O_5$, and $(NH_4)_2HPO_4$ were stoichiometrically controlled so as to obtain a target product having the composition of Table 1 below in the preparation of the precursor mixture.

Preparation Example 10

A cathode active material having the composition as shown in Table 1 below was obtained in the same manner as in Preparation Example 9, except that WO3 was used instead of $Nb_2O_5$ in the preparation of the precursor mixture.

Preparation Example 11

A cathode active material having the composition as shown in Table 1 below was obtained in the same manner as in Preparation Example 9, except that $MoO_2$ was used instead of $Nb_2O_5$ in the preparation of the precursor mixture.

Preparation Example 12

A cathode active material having the composition as shown in Table 1 below was obtained in the same manner as in Preparation Example 9, except that $Ta_2O_5$ was used instead of $Nb_2O_5$ in the preparation of the precursor mixture.

Comparative Preparation Example 1

A cathode active material $Li_6Co_5(P_2O_7)_4$ having the composition as shown in Table 1 below was obtained in the same manner as in Preparation Example 1, except that $Nb_2O_5$ was not used in the preparation of the precursor mixture.

TABLE 1

| | Composition |
|---|---|
| Preparation Example 1 | $Li_6Co_{4.95}Nb_{0.05}(P_2O_7)_4$ |
| Preparation Example 2 | $Li_6Co_{4.95}W_{0.05}(P_2O_7)_4$ |
| Preparation Example 3 | $Li_6Co_{4.95}Mo_{0.05}(P_2O_7)_4$ |
| Preparation Example 4 | $Li_6Co_{4.95}Ta_{0.05}(P_2O_7)_4$ |
| Preparation Example 5 | $Li_6Co_{4.90}Nb_{0.10}(P_2O_7)_4$ |
| Preparation Example 6 | $Li_6Co_{4.90}W_{0.10}(P_2O_7)_4$ |
| Preparation Example 7 | $Li_6Co_{4.90}Mo_{0.10}(P_2O_7)_4$ |
| Preparation Example 8 | $Li_6Co_{4.90}Ta_{0.10}(P_2O_7)_4$ |
| Preparation Example 9 | $Li_6Co_{4.75}Nb_{0.25}(P_2O_7)_4$ |
| Preparation Example 10 | $Li_6Co_{4.75}W_{0.25}(P_2O_7)_4$ |
| Preparation Example 11 | $Li_6Co_{4.75}Mo_{0.25}(P_2O_7)_4$ |
| Preparation Example 12 | $Li_6Co_{4.75}Ta_{0.25}(P_2O_7)_4$ |
| Comparative Preparation Example 1 | $Li_6Co_5(P_2O_7)_4$ |

Manufacture of Lithium Secondary Battery

Example 1

$Li_6Co_{4.95}Nb_{0.05}(P_2O_7)_4$ as the cathode active material of Preparation Example 1, carbon black (Super-P; Timcal Ltd.) as a conducting agent, polyvinylidene fluoride (PVdF), and N-methyl pyrrolidone were mixed to obtain a cathode slurry. In the cathode slurry, the mixing weight ratio of $Li_6Co_{4.95}Nb_{0.05}(P_2O_7)_4$, carbon black, and PVDF was 50:30:20, and the content of N-methyl pyrrolidone was about 20 g based on 1 g of the cathode active material.

The cathode slurry was applied onto an aluminum foil having a thickness of about 15 μm and dried at 25° C. Then, the dried product was dried and rolled in vacuum at about 120° C. to prepare a cathode having a thickness of about 55 μm.

A 2032 type coin cell was manufactured using the cathode and a lithium metal electrode as a counter electrode. A separator made of a porous polyethylene (PE) film and having a thickness of about 16 μm was disposed between the cathode and the lithium metal electrode, and an electrolyte was injected to manufacture a lithium secondary battery in the form of a 2032 type coin cell. As the electrolyte, a solution in which 1.0M $LiPF_6$ was dissolved in a mixed solvent of fluoroethylene carbonate (FEC) and bis(2,2,2-trifluoroethyl) carbonate (HFDEC) in a volume ratio of 1:1 was used.

Examples 2 to 12

Lithium secondary batteries were manufactured in the same manner as in Example 1, except that each of the cathode active materials of Preparation Examples 2 to 12 was used instead of the cathode active material of Preparation Example 1 in the preparation of the cathode.

Comparative Example 1

Lithium secondary batteries were manufactured in the same manner as in Example 1, except that the cathode active materials of Comparative Preparation Example 1 was used instead of the cathode active material of Preparation Example 1 in the preparation of the cathode.

Evaluation Example 1: X-Ray Diffraction Analysis

X-ray diffraction analysis was performed on the cathode active materials of Preparation Examples 1 to 4 and Comparative Preparation Example 1. X-ray diffraction analysis was performed with X'pert pro (PANalytical) using Cu-Kα radiation (1.54056 Å).

The results of X-ray diffraction analysis of the cathode active materials of Preparation Examples 1 to 4 and Comparative Preparation Example 1 are shown in FIG. 1. FIG. 1 shows the theoretical spectrum of $Li_{5.88}Co_{5.08}(P_2O_7)_4$ for reference.

It was confirmed that the cathode active materials of Preparation Examples 1 to 4 belong to a triclinic crystal system, and belong to a P-1 space group.

It was confirmed that the cathode active materials of Preparation Examples 1 to 4 had a stable crystalline phase by introducing cobalt having high phase stability.

The intensity ratio of a primary peak and a secondary peak, obtained by X-ray diffraction analysis of the cathode active materials of Preparation Examples 1 and 2, was measured according to Equation 1 below, and the results thereof are shown in Table 2 below.

The primary peak is a peak exhibiting the maximum absorption intensity, and appears at a diffraction angle of 28.0°2θ, and the secondary peak is a peak having smaller absorption intensity than the primary peak and appears at a diffraction angle of 33.5°2θ.

Peak Intensity ratio (P2/P1)=secondary peak Intensity (P2)/primary peak Intensity (P1)     <Equation 1>

TABLE 2

| | Intensity ratio (P2/P1) |
|---|---|
| Preparation Example 1 | 0.133 |
| Preparation Example 2 | 0.132 |

Evaluation Example 2: Band Gap Calculation

Band gaps were calculated for the compositions of the cathode active materials prepared in Preparation Examples 1 to 4 and Comparative Preparation Example 1.

Voltage calculation was performed using quantum calculation. Quantum calculation was performed using a density functional theory (DFT).

The band gap calculation results of the cathode active materials prepared in Preparation Examples 1 to 4 and Comparative Preparation Example 1 are shown in FIGS. 2A to 2E and Table 3 below, respectively.

In FIGS. 2A to 2E, DOE refers to density of states (DOS), up/down refers to spin up/spin down, and Ef refers to Fermi energy. E-Ef refers to corrected Fermi energy.

Figure 2A:
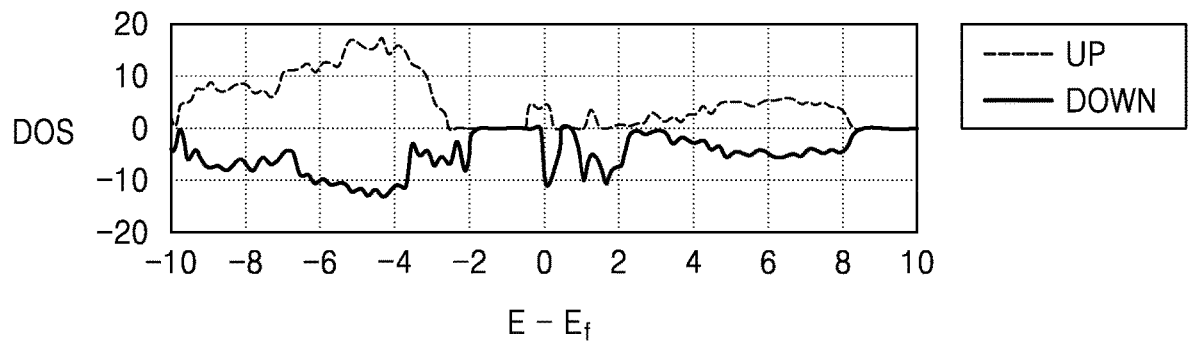
FIG. 2A is a graph of density of states (DOS, a.u.) versus corrected Fermi energy (E-Ef, electron volts (eV)) illustrating a density functional theory (DFT) calculation result for the composition of the cathode active material of Preparation Example 1.
Figure 2B:
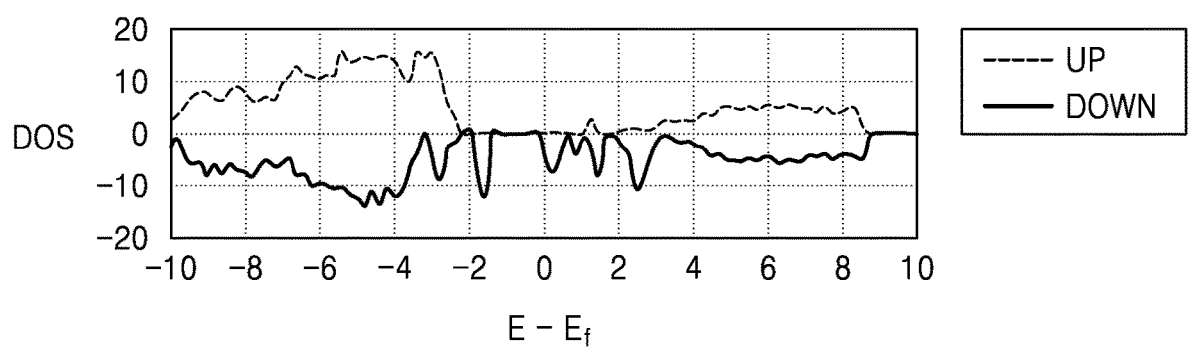
FIG. 2B is a graph of density of states (DOS, a.u.) versus corrected Fermi energy (E-Ef, electron volts (eV)) illustrating a density functional theory (DFT) calculation result for the composition of the cathode active material of Preparation Example 2.
Figure 2C:
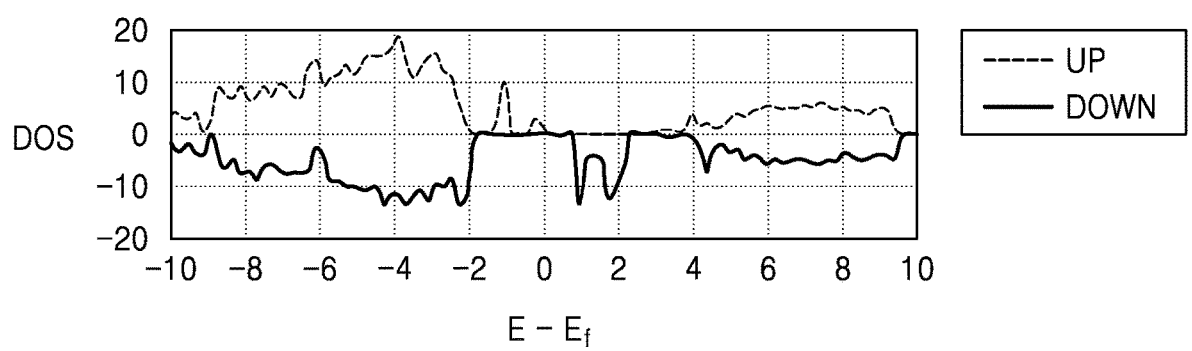
FIG. 2C is a graph of density of states (DOS, a.u.) versus corrected Fermi energy (E-Ef, electron volts (eV)) illustrating a density functional theory (DFT) calculation result for the composition of the cathode active material of Preparation Example 3.
Figure 2D:
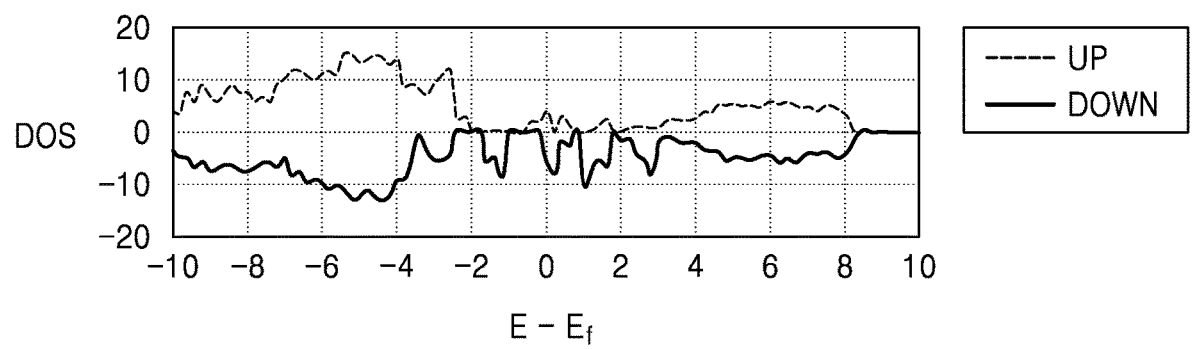
FIG. 2D is a graph of density of states (DOS) versus corrected Fermi energy (E-Ef, electron volts (eV)) illustrating a density functional theory (DFT) calculation result for the composition of the cathode active material of Preparation Example 4.
Figure 2E:
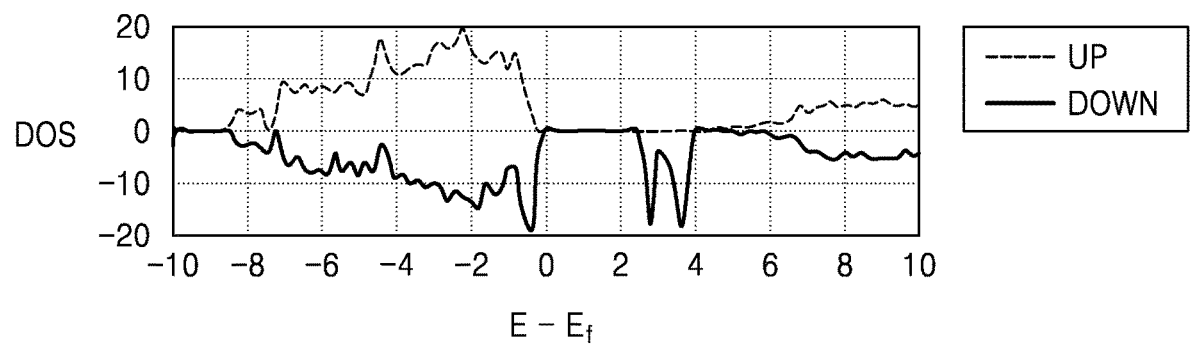
FIG. 2E is a graph of density of states (DOS) versus corrected Fermi energy (E-Ef, electron volts (eV)) illustrating a density functional theory (DFT) calculation result for the composition of the cathode active material of Comparative Preparation Example 1.

For example, in FIG. 2E, the band gap is large in the range of −2 eV to 0 eV, but in FIGS. 2A to 2D, the band gap decreases in the range of −2 eV to 0 eV.

TABLE 3

| | Band gap [eV] |
|---|---|
| Preparation Example 1 | 0.1 |
| Preparation Example 2 | 0.1 |
| Preparation Example 3 | 1.0 |
| Preparation Example 4 | 0.2 |
| Comparative Preparation Example 1 | 2.9 |

As shown in FIGS. 2A to 2E and Table 3, the cathode active materials of Preparation Examples 1 to 4 exhibited significantly reduced band gaps compared to the cathode active material of Comparative Preparation Example 1.

Therefore, the cathode active materials of Preparation Examples 1 to 4 may provide improved electronic conductivity compared to the cathode active material of Comparative Preparation Example 1.

Evaluation Example 3: Charge-Discharge Characteristics

Each of the lithium secondary batteries prepared in Examples 1 to 12 and Comparative Examples 1 to 2 was charged with a constant current at 25° C. at a rate of 0.1 C until a voltage reached 5.5 V (vs. Li), and was then discharged with a constant current at a rate of 0.025 C until the voltage reached 4.0 V (vs. Li) during discharge (1St cycle). A C rate means a current which will discharge a battery in one hour, e.g., a C rate for a battery having a discharge capacity of 1.6 ampere-hours would be 1.6 amperes.

The lithium secondary battery having undergone the 1st cycle was charged with a constant current at 25° C. at a rate of 0.1 C until a voltage reached 5.5 V (vs. Li), and was then discharged with a constant current at a rate of 0.05 C until the voltage reached 4.0 V (vs. Li) during discharge ($2^{nd}$ cycle).

The lithium secondary battery having undergone the $2^{nd}$ cycle was charged with a constant current at 25° C. at a rate of 0.1 C until a voltage reached 5.5 V (vs. Li), and was then discharged with a constant current at a rate of 0.1 C until the voltage reached 4.0 V (vs. Li) during discharge ($3^{rd}$ cycle).

The lithium secondary battery having undergone the $3^{rd}$ cycle was charged with a constant current at 25° C. at a rate of 0.1 C until a voltage reached 5.5 V (vs. Li), and was then discharged with a constant current at a rate of 0.2 C until the voltage reached 4.0 V (vs. Li) during discharge (4th cycle).

The lithium secondary battery having undergone the 4th cycle was charged with a constant current at 25° C. at a rate of 0.1 C until a voltage reached 5.5 V (vs. Li), and was then discharged with a constant current at a rate of 0.5 C until the voltage reached 4.0 V (vs. Li) during discharge ($5^{th}$ cycle).

In all the above charge-discharge cycles, a 10-minutes stop time was set after one charge-discharge cycle.

Figure 3A:
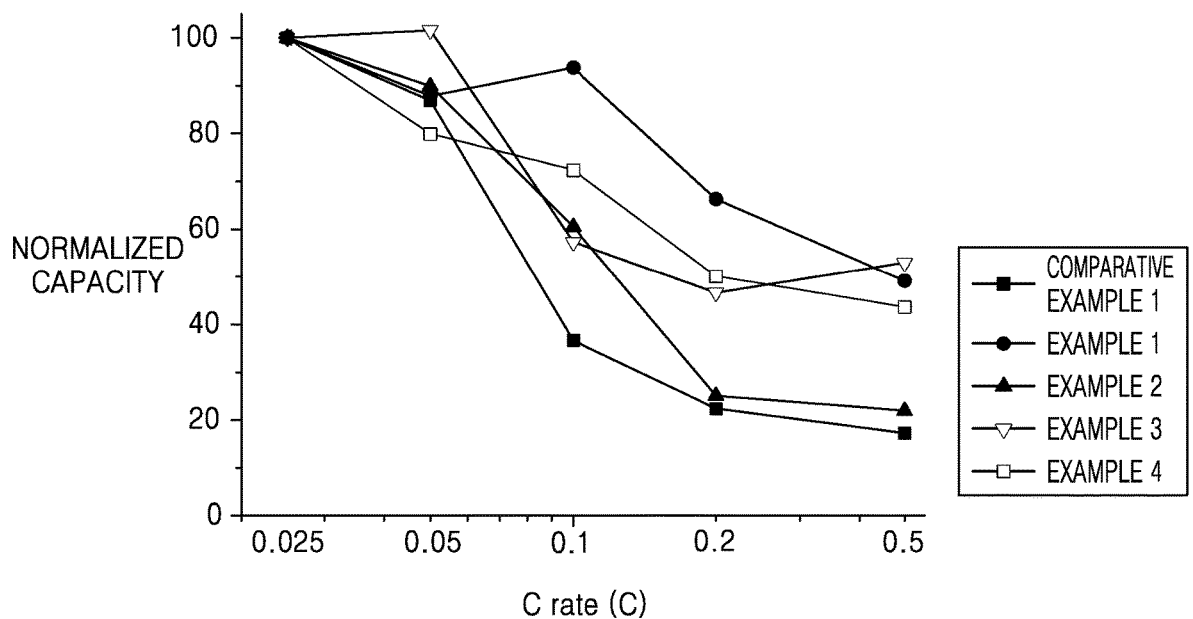
FIG. 3A is a graph of normalized capacity versus C rate illustrating the evaluation of high-rate characteristics of lithium batteries of Examples 1 to 4 and Comparative Example 1.
Figure 3B:
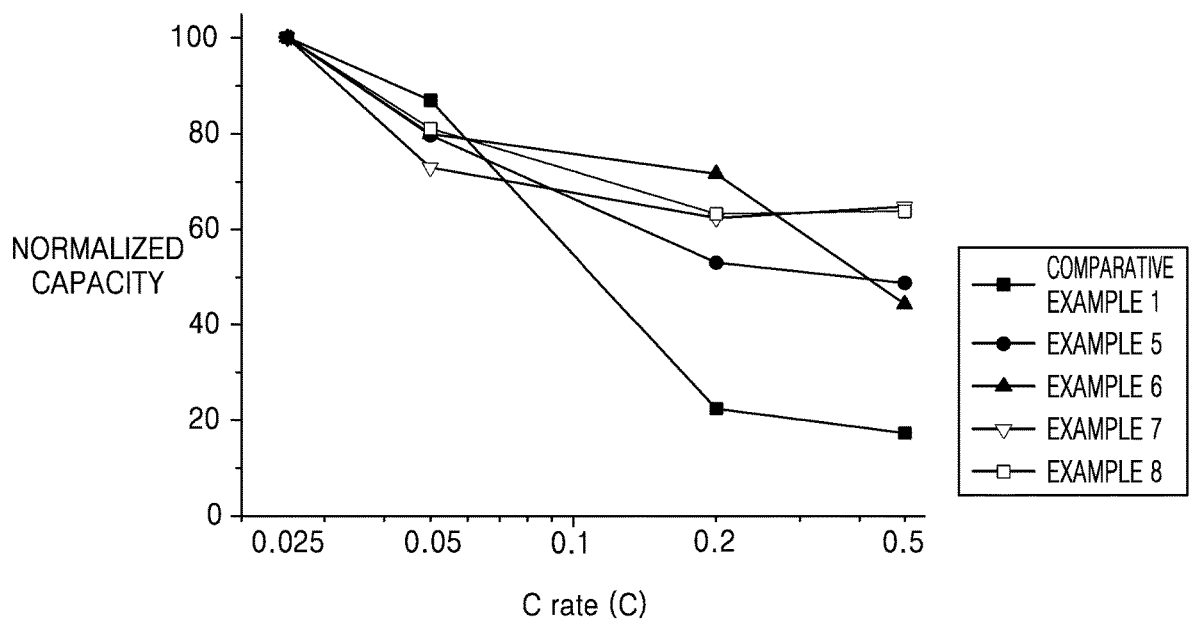
FIG. 3B is a graph of normalized capacity versus C rate illustrating the evaluation of high-rate characteristics of lithium batteries of Examples 5 to 8 and Comparative Example 1.
Figure 3C:
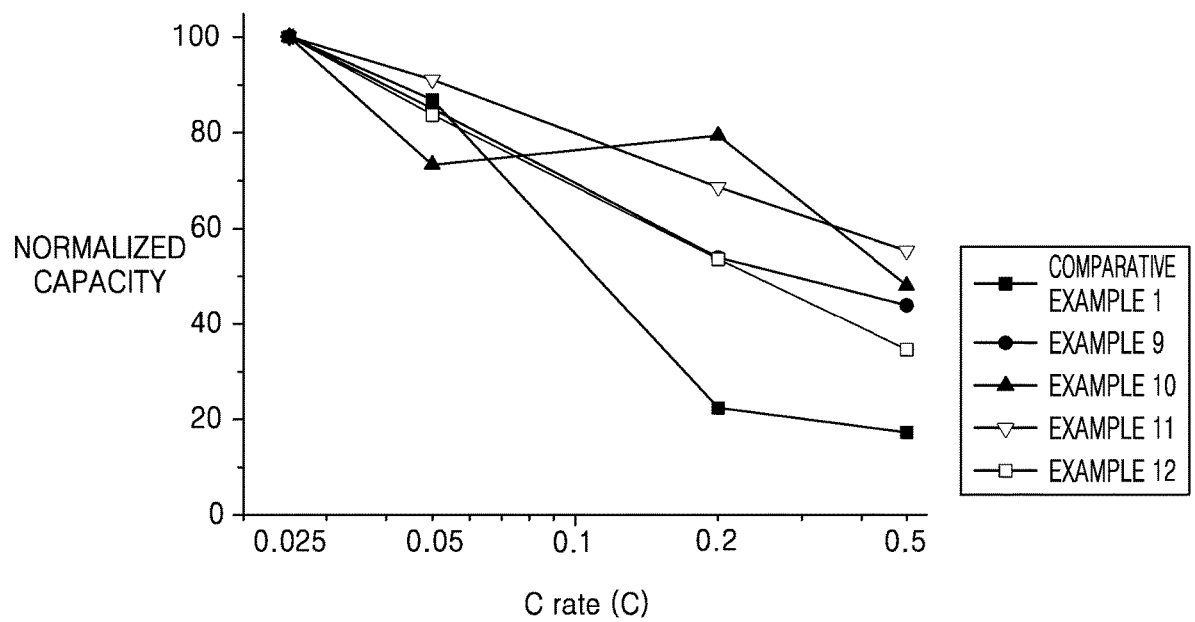
FIG. 3C is a graph of normalized capacity versus C rate illustrating the evaluation of high-rate characteristics of lithium batteries of Examples 9 to 12 and Comparative Example 1.

The results of charge-discharge experiments are shown in FIGS. 3A to 3C and Table 4 below. High-rate characteristics are defined by Equation 2 below.

High-rate characteristics [%]=[discharge capacity at 5th cycle (0.5 C rate)/discharge capacity at $1^{st}$ cycle (0.025 C rate)]×100%    Equation 2

TABLE 4

| | High-rate characteristics (0.5 C./0.025 C.) [%] |
|---|---|
| Example 1 | 49.2 |
| Example 2 | 22.0 |
| Example 3 | 53.0 |
| Example 4 | 43.6 |
| Example 5 | 48.7 |
| Example 6 | 44.4 |
| Example 7 | 64.6 |
| Example 8 | 63.7 |
| Example 9 | 43.9 |
| Example 10 | 48.1 |
| Example 11 | 55.3 |
| Example 12 | 34.6 |
| Comparative Example 1 | 17.3 |

As shown in FIGS. 3A to 3C and Table 4, the lithium batteries of Examples 1 to 12 had improved high-rate characteristics compared to the lithium battery of Comparative Example 1.

It was determined that the improvement in the high-rate characteristics was due to a decrease in internal resistance of the lithium batteries of Examples 1 to 12 by having increased electronic conductivity due to a decrease in the band gap of the cathode active materials of Preparation Examples 1 to 12.

According to an aspect, a cathode active material providing a high voltage and having excellent high-rate characteristics is provided.

By employing a cathode including such a cathode active material, a secondary battery having improved high-rate characteristics and energy density may be manufactured.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A cathode active material comprising a compound represented by Formulas 2a to 2r:

$$Li_x(Co_{1-y}Nb_y)_z(P_2O_7)_4 \quad \text{Formula 2a}$$

wherein in Formula 2a, $5.5 \leq x \leq 6.5$, $0.01 \leq y \leq 0.05$, and $4.8 \leq z \leq 5.2$, $$Li_x(Co_{1-y}Mo_y)_z(P_2O_7)_4 \quad \text{Formula 2b}$$

wherein in Formula 2b, $5.5 \leq x \leq 6.5$, $0.01 \leq y \leq 0.05$, and $4.8 \leq z \leq 5.2$, $$Li_x(Co_{1-y}Ta_y)_z(P_2O_7)_4 \quad \text{Formula 2c}$$

wherein in Formula 2c, $5.5 \leq x \leq 6.5$, $0.01 \leq 00.05$, and $4.8 \leq z \leq 5.2$, $$Li_x(Co_{1-y}W_y)_z(P_2O_7)_4 \quad \text{Formula 2d}$$

wherein in Formula 2d, $5.5 \leq x \leq 6.5$, $0.01 \leq 00.05$, and $4.8 \leq z \leq 5.2$, $$Li_x(Co_{1-y}Y_y)_z(P_2O_7)_4 \quad \text{Formula 2e}$$

wherein in Formula 2e, $5.5 \leq x \leq 6.5$, $0.01 \leq y \leq 0.05$, and $4.8 \leq z \leq 5.2$, $$Li_x(Co_{1-y}La_y)_z(P_2O_7)_4 \quad \text{Formula 2f}$$

wherein in Formula 2f, $5.5 \leq x \leq 6.5$, $0.01 \leq y \leq 0.05$, and $4.8 \leq z \leq 5.2$, $$Li_x(Co_{1-y}Zr_y)_z(P_2O_7)_4 \quad \text{Formula 2g}$$

wherein in Formula 2g, $5.5 \leq x \leq 6.5$, $0.01 \leq y \leq 0.05$, and $4.8 \leq z \leq 5.2$, $$Li_x(Co_{1-y}Hf_y)_z(P_2O_7)_4 \quad \text{Formula 2h}$$

wherein in Formula 2h, $5.5 \leq x \leq 6.5$, $0.01 \leq y \leq 0.05$, and $4.8 \leq z \leq 5.2$, $$Li_x(Co_{1-y}Tc_y)_z(P_2O_7)_4 \quad \text{Formula 2i}$$

wherein in Formula 2i, $5.5 \leq x \leq 6.5$, $0.01 \leq y \leq 0.05$, and $4.8 \leq z \leq 5.2$, $$Li_x(Co_{1-y}Re_y)_z(P_2O_7)_4 \quad \text{Formula 2j}$$

wherein in Formula 2j, $5.5 \leq x \leq 6.5$, $0.01 \leq y \leq 0.05$, and $4.8 \leq z \leq 5.2$, $$Li_x(Co_{1-y}Ru_y)_z(P_2O_7)_4 \quad \text{Formula 2k}$$

wherein in Formula 2k, $5.5 \leq x \leq 6.5$, $0.01 \leq y \leq 0.05$, and $4.8 \leq z \leq 5.2$, $$Li_x(Co_{1-y}Os_y)_z(P_2O_7)_4 \quad \text{Formula 2l}$$

wherein in Formula 2l, $5.5 \leq x \leq 6.5$, $0.01 \leq y \leq 0.05$, and $4.8 \leq z \leq 5.2$, $$Li_x(Co_{1-y}Rh_y)_z(P_2O_7)_4 \quad \text{Formula 2m}$$

wherein in Formula 2m, $5.5 \leq x \leq 6.5$, $0.01 \leq y \leq 0.05$, and $4.8 \leq z \leq 5.2$, $$Li_x(Co_{1-y}Ir_y)_z(P_2O_7)_4 \quad \text{Formula 2n}$$

wherein in Formula 2n, $5.5 \leq x \leq 6.5$, $0.01 \leq y \leq 0.05$, and $4.8 \leq z \leq 5.2$, $$Li_x(Co_{1-y}Pd_y)_z(P_2O_7)_4 \quad \text{Formula 2o}$$

wherein in Formula 2o, $5.5 \leq x \leq 6.5$, $0.01 \leq y \leq 0.05$, and $4.8 \leq z \leq 5.2$, $$Li_x(Co_{1-y}Pt_y)_z(P_2O_7)_4 \quad \text{Formula 2p}$$

wherein in Formula 2p, $5.5 \leq x \leq 6.5$, $0.01 \leq y \leq 0.05$, and $4.8 \leq z \leq 5.2$, $$Li_x(Co_{1-y}Ag_y)_z(P_2O_7)_4 \quad \text{Formula 2q}$$

wherein in Formula 2q, $5.5 \leq x \leq 6.5$, $0.01 \leq y \leq 0.05$, and $4.8 \leq z \leq 5.2$, or $$Li_x(Co_{1-y}Au_y)_z(P_2O_7)_4 \quad \text{Formula 2r}$$

wherein in Formula 2r, $5.5 \leq x \leq 6.5$, $0.01 \leq y \leq 0.05$, and $4.8 \leq z \leq 5.2$.

2. The cathode active material of claim 1,
wherein the compound of Formulas 2a-2r has a crystal structure belonging to a triclinic crystal system.

3. The cathode active material of claim 1,
wherein the compound of Formulas 2a-2r has a crystal structure belonging to a P–1 space group.

4. The cathode active material of claim 1,
wherein the compound of Formulas 2a-2r has a band gap of about 0.1 electron volt to about 2.0 electron volts.

5. The cathode active material of claim 1,
wherein the compound of Formulas 2a-2r has an average discharge voltage of 4 volts or more.

6. The cathode active material of claim 1,
wherein, when analyzed by X-ray diffraction using Cu-Kα radiation, the compound represented by Formulas 2a-2r has a primary peak at a diffraction angle, 2θ, of 28.0°±1.0°, and a secondary peak at a diffraction angle, 2θ, of 33.5°±1.0°.

7. The cathode active material of claim 6,
wherein a ratio of an intensity of the secondary peak to an intensity of the primary peak, is greater than 0 and equal to or less than about 0.5.

8. A cathode comprising: a cathode current collector and a cathode active material layer on a surface of the cathode current collector, the cathode active material layer comprising the cathode active material of claim 1.

9. A secondary battery comprising:
a cathode; an anode; and an electrolyte between the cathode and the anode,
wherein the cathode comprises the cathode active material of claim 1.

10. The secondary battery of claim 9,
wherein the secondary battery is a multi-layer ceramic battery or a thin-film battery comprising the cathode active material.

11. The secondary battery of claim 10,
wherein the multi-layer ceramic battery comprises:
a plurality of cathode layers, at least one of the plurality of the cathode layers comprising the cathode active material;
a plurality of anode layers alternately arranged between the plurality of cathode layers; and
a plurality of solid electrolyte layers alternately arranged between the plurality of cathode layers and the plurality of anode layers.

12. The secondary battery of claim 9,
wherein the electrolyte comprises an oxide solid electrolyte.

13. The secondary battery of claim 9,
wherein the anode comprises a lithium metal phosphate oxide, a lithium metal oxide, a metal oxide, or a combination thereof.

14. The secondary battery of claim 10,
wherein the multi-layer ceramic battery is a sintered product.

15. A method of preparing a cathode active material of claim 1, the method comprising:
mixing a cobalt precursor, a lithium precursor, a phosphorus precursor, and an M precursor to prepare a precursor mixture; and heat-treating the precursor mixture to form the cathode active material of claim 1.

16. The method of claim 15, wherein the heat-treating of the precursor mixture is performed at about 500° C. to about 1000° C. for about 1 hour to about 48 hours.

17. The method of claim 15, wherein the heat-treating comprises heat-treating the precursor mixture in an oxidative atmosphere or in an inert atmosphere.

* * * * *